(12) United States Patent
Amano

(10) Patent No.: US 9,376,032 B2
(45) Date of Patent: Jun. 28, 2016

(54) VEHICLE AND CONTROL METHOD FOR VEHICLE

(75) Inventor: Takashi Amano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/355,015

(22) PCT Filed: Nov. 4, 2011

(86) PCT No.: PCT/JP2011/075405
§ 371 (c)(1),
(2), (4) Date: Apr. 29, 2014

(87) PCT Pub. No.: WO2013/065166
PCT Pub. Date: May 10, 2013

(65) Prior Publication Data
US 2014/0297087 A1  Oct. 2, 2014

(51) Int. Cl.
*B60L 9/00* (2006.01)
*B60L 15/20* (2006.01)
(Continued)

(52) U.S. Cl.
CPC ............... *B60L 15/20* (2013.01); *B60K 6/445* (2013.01); *B60L 11/123* (2013.01); *B60L 11/14* (2013.01); *B60L 11/1803* (2013.01); *B60L 11/1862* (2013.01); *B60L 11/1887* (2013.01); *B60L 15/2045* (2013.01); *B60W 10/08* (2013.01); *B60W 20/00* (2013.01); *B60L 2210/10* (2013.01); *B60L 2210/40* (2013.01); *B60L 2240/12* (2013.01); *B60L 2240/423* (2013.01); *B60L 2240/547* (2013.01); *B60L 2240/549* (2013.01); *B60L 2240/642* (2013.01); *B60W 2550/142* (2013.01); *B60W 2710/086* (2013.01); *Y02T 10/6217* (2013.01); *Y02T 10/6239* (2013.01); *Y02T 10/645* (2013.01); *Y02T 10/705* (2013.01); *Y02T 10/7044* (2013.01); *Y02T 10/7077* (2013.01); *Y02T 10/7216* (2013.01); *Y02T 10/7241* (2013.01); *Y02T 10/7283* (2013.01); *Y02T 10/7291* (2013.01); *Y02T 90/16* (2013.01); *Y02T 90/34* (2013.01)

(58) Field of Classification Search
None
See application file for complete search history.

(56) References Cited

U.S. PATENT DOCUMENTS

| 6,053,842 A * | 4/2000 | Kitada et al. .................. 477/5 |
| 2006/0102398 A1 | 5/2006 | Mizuno |

(Continued)

FOREIGN PATENT DOCUMENTS

| DE | 102004017115 A1 | 10/2005 |
| JP | 09-242579 | 9/1997 |

(Continued)

*Primary Examiner* — Thomas Tarcza
*Assistant Examiner* — Garrett Evans
(74) *Attorney, Agent, or Firm* — Oliff PLC

(57) ABSTRACT

A vehicle includes: a motor generator generating driving power for traveling of the vehicle; an ECU for controlling the motor generator; and an inclination detecting unit for detecting an inclination of a road surface. The ECU executes a driving power change operation that causes the vehicle to travel while switching between a first state (high output state) of the motor generator where first-level driving power is generated and a second state (low output state) of the motor generator where driving power smaller than that in the first state is generated. When it is recognized that the vehicle is traveling on a downhill, based on the inclination detected by the inclination detecting unit, the ECU sets the driving power in the first state to be smaller than that when the vehicle travels on a flat road.

19 Claims, 15 Drawing Sheets

(51) Int. Cl.
*B60K 6/445* (2007.10)
*B60W 10/08* (2006.01)
*B60W 20/00* (2016.01)
*B60L 11/12* (2006.01)
*B60L 11/14* (2006.01)
*B60L 11/18* (2006.01)

(56) References Cited

U.S. PATENT DOCUMENTS

2009/0146615 A1  6/2009  Zillmer et al.
2011/0035135 A1* 2/2011  Schwalm et al. ............ 701/110
2011/0276216 A1* 11/2011 Vaughan ..................... 701/29
2012/0123624 A1  5/2012  Sato et al.

FOREIGN PATENT DOCUMENTS

| | | |
|---|---|---|
| JP | 2004-127747 | 4/2004 |
| JP | 2007-187090 | 7/2007 |
| JP | 2008-520485 | 6/2008 |
| JP | 2009-298232 | 12/2009 |
| JP | 2010-006309 | 1/2010 |
| JP | 2011-011648 | 1/2011 |
| JP | 2011-046272 | 3/2011 |
| JP | 2012-110089 | 6/2012 |
| WO | WO 2006/053624 A1 | 5/2006 |

* cited by examiner

VEHICLE AND CONTROL METHOD FOR VEHICLE

TECHNICAL FIELD

The present invention relates to a vehicle and a control method for a vehicle, and more particularly to traveling control for the vehicle that travels using the inertial force of the vehicle.

BACKGROUND ART

In recent years, as an environmentally-friendly vehicle, a vehicle that has a power storage device (e.g., a secondary battery, a capacitor or the like) mounted thereon and travels using the driving power generated from the power stored in the power storage device has received attention. Such a vehicle includes, for example, an electric vehicle, a hybrid vehicle, a fuel cell vehicle and the like.

In these vehicles, it has been demanded to improve energy efficiency by reducing fuel consumption and electric power consumption for the purpose of further reducing environmental load.

Japanese National Patent Publication No. 2008-520485 (PTL 1) discloses a hybrid vehicle including an internal combustion engine and a motor generator, wherein the motor generator is controlled to alternately repeat a first interval during which the motor generator is driven to operate with a high output larger than the actual electric power consumption of a vehicle electric system and a second interval during which the motor generator is switched off, when the motor generator is in a generator mode.

According to Japanese National Patent Publication No. 2008-520485 (PTL 1), when the motor generator operates as a generator, the motor generator is driven at an operating point of high efficiency in the first interval and the motor generator is stopped in the second interval. With this, continuation of inefficient operation of the motor generator during power generation operation is suppressed, and thus, the energy efficiency of the vehicle in the power generation operation can be improved.

In addition, Japanese Patent Laying-Open No. 2010-6309 (PTL 2) discloses a hybrid vehicle including an internal combustion engine and a motor generator, wherein traveling using the driving power generated by the internal combustion engine and traveling in an inertial state in which the internal combustion engine is stopped are alternately repeated. With this, the internal combustion engine can be driven at an operating point of high efficiency, and thus, the fuel consumption can be improved.

CITATION LIST

Patent Literature

PTL 1: Japanese National Patent Publication No. 2008-520485
PTL 2: Japanese Patent Laying-Open No. 2010-6309
PTL 3: Japanese Patent Laying-Open No. 2009-298232
PTL 4: Japanese Patent Laying-Open No. 2007-187090

SUMMARY OF INVENTION

Technical Problem

However, Japanese National Patent Publication No. 2008-520485 (PTL 1) described above discloses such a configuration that driving and stopping of the motor generator are repeated when the motor generator generates electric power. The driving power for traveling the vehicle is not changed.

In addition, Japanese Patent Laying-Open No. 2010-6309 (PTL 2) discloses the hybrid vehicle, wherein acceleration inertial traveling control is executed by repeating driving and stopping of an engine serving as the internal combustion engine. In Japanese Patent Laying-Open No. 2010-6309 (PTL 2), the operation of the motor generator is not taken into consideration.

When an inclination of a road surface on which the vehicle travels changes during acceleration inertial traveling as disclosed in Japanese Patent Laying-Open No. 2010-6309 (PTL 2), acceleration and deceleration of the vehicle is affected by the gravity acting on the vehicle. Therefore, in order to maintain the vehicle speed, an output of a driving source must be controlled in accordance with the change in the inclination of the road surface. Japanese Patent Laying-Open No. 2010-6309 (PTL 2) does not, however, describe specific control when there is a change in the inclination of the road surface on which the vehicle travels.

The present invention has been made to solve the aforementioned problems and an object of the present invention is to, in a vehicle that can travel using the driving power from an engine and/or a motor generator, appropriately improve the energy efficiency during traveling of the vehicle in consideration of a change in an inclination of a road surface.

Solution to Problem

A vehicle according to the present invention includes: a driving source generating driving power for traveling of the vehicle; a control device for controlling the driving source; and an inclination detecting unit for detecting an inclination of a road surface. The control device executes a driving power change operation that causes the vehicle to travel while switching between a first state of the driving source where first-level driving power is generated and a second state of the driving source where driving power smaller than that in the first state is generated. When it is recognized that the vehicle is traveling on a downhill, based on the inclination detected by the inclination detecting unit, the control device sets the driving power in the first state to be smaller than that when the vehicle is traveling on a flat road.

Preferably, when a change in driving power requested from a user is within a prescribed range, the control device executes the driving power change operation.

Preferably, the control device switches between the first and second states such that a speed of the vehicle is maintained within a permitted range during execution of the driving power change operation.

Preferably, the control device switches to the first state in response to the speed of the vehicle having decreased to a lower limit value within the permitted range, and switches to the second state in response to the speed of the vehicle having increased to an upper limit value within the permitted range.

Preferably, the control device sets the lower limit value when the vehicle is traveling on the downhill to be higher than that when the vehicle is traveling on the flat road.

Preferably, when the vehicle returns from the downhill to the flat road, the control device gently decreases the lower limit value over time.

Preferably, the control device sets the driving power in the second state when the vehicle is traveling on the downhill to be larger than that when the vehicle is traveling on the flat road.

Preferably, the driving source is a rotating electric machine. When the vehicle is traveling on the downhill, the control device executes a regenerative operation of the rotating electric machine in the second state.

Preferably, the control device sets the driving power in the first state to become smaller as magnitude of the inclination in a downward direction becomes larger.

Preferably, the driving power in the first state is set to be larger than constant reference driving power that can maintain a speed of the vehicle. The driving power in the second state is set to be smaller than the reference driving power.

Preferably, the control device stops generation of the driving power from the driving source in the second state.

Preferably, the vehicle travels mainly using inertial force of the vehicle in the second state.

Preferably, the vehicle further includes another driving source generating the driving power for traveling of the vehicle. The control device executes the driving power change operation that switches between a third state of another driving source where second-level driving power is generated and a fourth state of another driving source where driving power smaller than that in the third state is generated.

Preferably, the control device brings another driving source into the third state when the driving source is in the first state, and brings another driving source into the fourth state when the driving source is in the second state.

Preferably, the control device sets the driving power of another driving source in the third state when the vehicle is traveling on the downhill to be smaller than that when the vehicle is traveling on the flat road.

Preferably, a sum of the driving power of the driving source in the first state and the driving power of another driving source in the third state is set to be larger than constant reference driving power that can maintain a speed of the vehicle. A sum of the driving power of the driving source in the second state and the driving power of another driving source in the fourth state is set to be smaller than the reference driving power.

Preferably, one of the driving source and another driving source is a rotating electric machine, and the other of the driving source and another driving source is an engine.

Preferably, both of the driving source and another driving source are rotating electric machines.

Preferably, the driving source is either a rotating electric machine or an engine.

A control method for a vehicle according to the present invention is a control method for a vehicle having a driving source generating driving power for traveling thereof and an inclination detecting unit for detecting an inclination of a road surface. The control method includes the steps of: bringing the driving source into a first state where driving power of a prescribed level is generated; bringing the driving source into a second state where driving power smaller than that in the first state is generated; executing a driving power change operation that causes the vehicle to travel while switching between the first and second states; and when it is recognized that the vehicle is traveling on a downhill, based on the inclination detected by the inclination detecting unit, setting the driving power in the first state to be smaller than that when the vehicle is traveling on a flat road.

Advantageous Effects of Invention

According to the present invention, in a vehicle that can travel using the driving power from an engine and/or a motor generator, the energy efficiency during traveling of the vehicle can be appropriately improved in consideration of a change in an inclination of a road surface.

DESCRIPTION OF EMBODIMENTS

Figure 1:
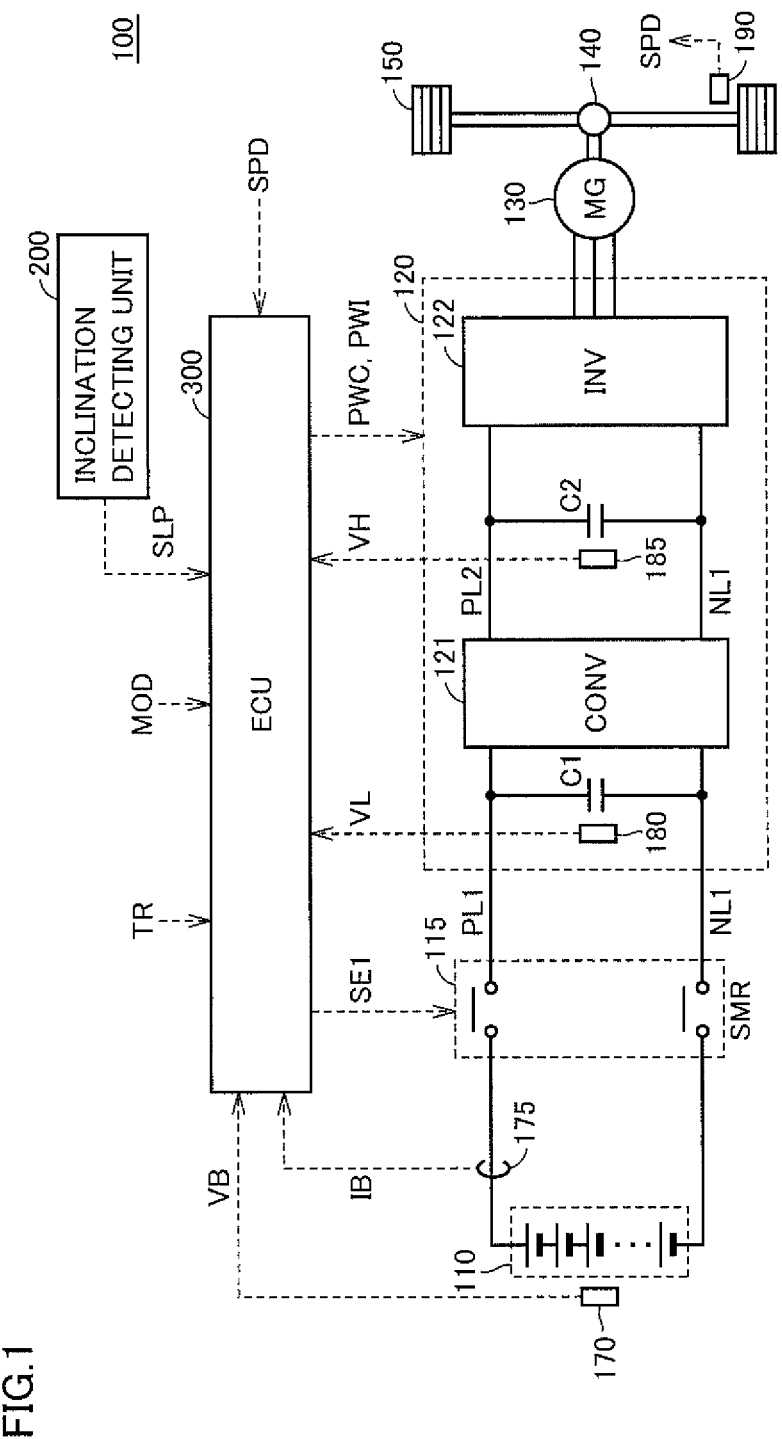
FIG. 1 is an overall block diagram of a vehicle according to a first embodiment.

Embodiments of the present invention will be described in detail hereinafter with reference to the drawings, in which the same reference characters are given to the same or corresponding components and description thereof will not be repeated.

[First Embodiment]

FIG. 1 is an overall block diagram of a vehicle 100 according to a first embodiment of the present invention. As described in detail below, vehicle 100 is an electric vehicle or a fuel cell vehicle in which a rotating electric machine is used as a driving source.

Referring to FIG. 1, vehicle 100 includes a power storage device 110, a system main relay (SMR) 115, a PCU (Power Control Unit) 120 serving as a driving device, a motor generator 130, a motive power transmission gear 140, a driving wheel 150, an inclination detecting unit 200, and an ECU (Electronic Control Unit) 300 serving as a control device. PCU 120 includes a converter 121, an inverter 122, voltage sensors 180 and 185, and capacitors C1 and C2.

Power storage device 110 is a power storing component configured to be rechargeable. Power storage device 110 is configured to include, for example, a secondary battery such as a lithium ion battery, a nickel-metal hydride battery or a lead storage battery, or a power storage element such as an electric double layer capacitor.

Power storage device 110 is connected to PCU 120 by power lines PL1 and NL1. Power storage device 110 supplies, to PCU 120, electric power for generating the driving power for vehicle 100. Power storage device 110 also stores power generated by motor generator 130. An output of power storage device 110 is approximately 200 V, for example.

Power storage device 110 is provided with a voltage sensor 170 and a current sensor 175. Voltage sensor 170 detects a voltage VB of power storage device 110 and outputs the result of detection to ECU 300. Current sensor 175 detects a current IB inputted and outputted to and from the power storage device and outputs the detected value to ECU 300.

Relays included in SMR 115, each has one end connected to a positive electrode terminal or a negative electrode terminal of power storage device 110, and the other end connected to power lines PL1 or NL1 connected to PCU 120. Based on a control signal SE1 from ECU 300, SMR 115 switches supply and cutoff of the electric power between power storage device 110 and PCU 120.

Based on a control signal PWC from ECU 300, converter 121 makes voltage conversion between power lines PL1, NL1 and power lines PL2, NL1.

Inverter 122 is connected to power lines PL2 and NL1. Based on a control signal PWI from ECU 300, inverter 122 converts DC power supplied from converter 121 into AC power and drives motor generator 130.

Capacitor C1 is provided between power lines PL1 and NL1, and reduces voltage fluctuations between power lines PL1 and NL1. Capacitor C2 is provided between power lines PL2 and NL1, and reduces voltage fluctuations between power lines PL2 and NL1.

Voltage sensors 180 and 185 detect voltages VL and VH across capacitors C1 and C2, respectively, and output the detected values to ECU 300.

Motor generator 130 is an alternating-current rotating electric machine, and for example, a permanent magnet type synchronous motor including a rotor having a permanent magnet embedded therein.

The output torque of motor generator 130 is transmitted to driving wheel 150 through motive power transmission gear 140 configured to include a speed reducer and a power split device, and causes vehicle 100 to travel. During regenerative braking operation of vehicle 100, motor generator 130 can generate power by rotation of driving wheel 150. The generated power is then converted by PCU 120 into charging power for power storage device 110.

In order to detect a speed of vehicle 100 (vehicle speed), a speed sensor 190 is provided near driving wheel 150. Speed sensor 190 detects a vehicle speed SPD based on a rotational speed of driving wheel 150, and outputs the detected value to ECU 300. A rotational angle sensor (not shown) for detecting a rotational angle of motor generator 130 may also be used as the speed sensor. In this case, ECU 300 indirectly calculates vehicle speed SPD based on a temporal change in the rotational angle of motor generator 130, a reduction ratio and the like.

Inclination detecting unit 200 detects an inclination of a road surface on which vehicle 100 is traveling. Inclination detecting unit 200 then outputs a detected value SLP of the detected inclination to ECU 300. An inclination sensor, a G sensor and the like can, for example, be used as inclination detecting unit 200.

ECU 300 includes a CPU (Central Processing Unit), a memory device and an input/output buffer, although they are not shown in FIG. 1. ECU 300 receives the signals from the sensors and the like, and outputs the control signals to the devices. ECU 300 also controls power storage device 110 and the devices in vehicle 100. It should be noted that the control over these is not limited to processing by software and can also be executed by dedicated hardware (electronic circuit).

ECU 300 generates and outputs the control signals for controlling PCU 120, SMR 115 and the like. In FIG. 1, one control device is provided as ECU 300. Separate control devices may, however, be provided for each function or for each device to be controlled, like a control device for PCU 120, a control device for power storage device 110 and the like, for example.

Based on the detected values of voltage VB and current TB from voltage sensor 170 and current sensor 175 of power storage device 110, ECU 300 calculates a state of charge SOC of power storage device 110.

ECU 300 receives, from a higher-level ECU (not shown), requested torque TR set based on user's operation of an accelerator pedal (not shown). Based on requested torque TR from the user, ECU 300 generates control signals PWC and PWI for converter 121 and inverter 122, respectively, and drives motor generator 130.

ECU 300 also receives a mode signal MOD set by the user. This mode signal MOD is a signal for providing an instruction as to whether to execute inertial traveling control described below. Mode signal MOD is switched by a particular switch, a setting on an operation screen, or the like. Alternatively, mode signal MOD may be automatically set in response to satisfaction of a particular condition.

For example, ECU 300 operates to execute the inertial traveling control when mode signal MOD is on, and operates to execute normal traveling without executing the inertial traveling control when mode signal MOD is off.

In such a vehicle, when the driving power is generated by motor generator 130, the electric power of the power storage device is consumed. The capacity of power storage device 110 is predetermined. Therefore, in order that the vehicle can travel a distance as long as possible using the electric power stored in the power storage device, the energy efficiency during traveling must be improved and the power consumption must be reduced.

While the vehicle is traveling, the inertial force acts on the vehicle. Therefore, when the driving power generated by the motor generator during traveling becomes lower than the driving power required to maintain the vehicle speed, traveling with the inertial force acting on the vehicle (hereinafter also referred to as "inertial traveling") is continued for a while, although the vehicle speed decreases gradually.

Since the driving power outputted by the motor generator is small during this inertial traveling, the power consumption in the power storage device becomes low. Therefore, if traveling utilizing the inertial traveling is possible, the energy efficiency during traveling of the vehicle can be improved.

Thus, in the first embodiment, when the vehicle shown in FIG. 1 travels in such a manner that the torque requested from the user is maintained almost constant and thereby the vehicle speed is maintained almost constant, the inertial traveling control is executed, in which the acceleration traveling during which the driving power from the motor generator is in a high output state and the inertial traveling during which the driving power from the motor generator is in a low output state (including a case where the driving power is zero) are repeated (hereinafter this operation is also referred to as "driving power change operation"). With this, the energy efficiency during traveling is enhanced.

In such inertial traveling control, the user request torque is maintained almost constant as described above. However, when vehicle 100 comes to a downhill from a flat road, for example, vehicle 100 may be accelerated due to the gravity and the vehicle speed cannot, in some cases, be maintained within a prescribed permitted range, even if the user request torque is maintained constant.

Therefore, in the first embodiment, in addition to execution of the inertial traveling control using the driving power change operation of the motor generator, control is executed such that the driving power at the time of the acceleration traveling is decreased to be smaller than that on the flat road, when the road surface changes from the flat road to the downhill.

It should be noted that "decreasing the driving power" is intended to include decreasing a total of the driving power outputted during the acceleration traveling, in addition to decreasing an absolute value of the driving power. In other words, it also includes shortening a time period in which the driving power is generated, even if the absolute value of the driving power is the same as an absolute value of the driving power on the flat road.

Figure 2:
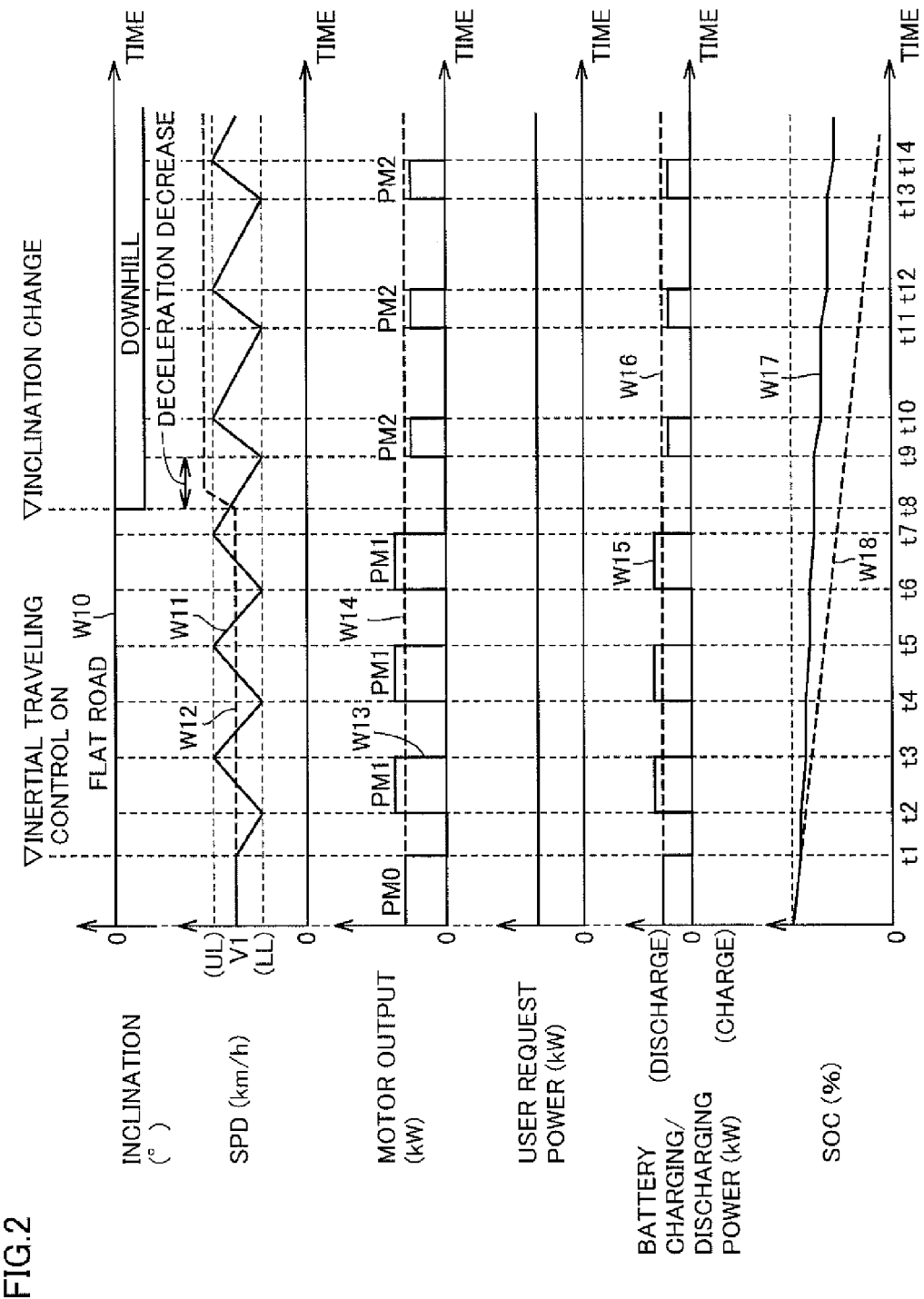
FIG. 2 is a time chart for describing an overview of inertial traveling control in the first embodiment.

FIG. 2 is a time chart for describing an overview of the inertial traveling control in the first embodiment. In FIG. 2, the horizontal axis indicates time and the vertical axis indicates an inclination of a road surface, vehicle speed SPD, an output of the motor generator, user request power, charging/discharging power for the power storage device (battery), and the SOC of the power storage device. It should be noted that, as to the charging/discharging power for the power storage device, the discharging power is expressed in a positive value and the charging power is expressed in a negative value.

Referring to FIGS. 1 and 2, a case where vehicle 100 is traveling on a flat road at a constant vehicle speed V1 (to time t8) will be first considered. In this case, as shown in FIG. 2, the power requested from the user is provided as an almost constant value. It should be noted that "the power requested from the user is an almost constant value" refers to a state where the user request power is maintained within a predetermined prescribed range (e.g., ±3%) during a prescribed time period, although there are some fluctuations.

When the inertial traveling control in the first embodiment is not applied, the output of motor generator 130 is continuously outputted with almost constant magnitude as shown by a broken line W14 in FIG. 2. As a result, vehicle speed SPD is maintained almost constant as shown by a broken line W12 in FIG. 2.

At this time, the constant power is continuously outputted from power storage device 110 as shown by a broken line W16 in FIG. 2. Therefore, the SOC of power storage device 110 decreases linearly as shown by a broken line W18 in FIG. 2.

However, at time t8, the inclination of the road surface changes and vehicle 100 comes to a downhill. Then, the driving power acting in the vehicle traveling direction is substantially increased due to the gravity acting on vehicle 100, and the deceleration decreases and the acceleration increases. As a result, as shown by a broken line W12 in FIG. 2, the vehicle speed may increase and it may become impossible to maintain the vehicle speed within the permitted range. Then, the distance between vehicle 100 and a vehicle ahead may become shorter gradually, which may lead to crash and the like.

On the other hand, when the inertial traveling control in the first embodiment is applied, the acceleration traveling during which motor generator 130 is in a driven state and the inertial traveling during which motor generator 130 is in a stopped state are alternately repeated basically.

Specifically, until time t1, the inertial traveling control in the first embodiment is not applied and a motor output PM0 is continuously outputted.

At time t1, the user provides an instruction to execute the inertial traveling control. Then, motor generator 130 is first stopped (a solid line W13 in FIG. 2). Then, the driving power is not supplied from motor generator 130, and thus, as shown by a solid line W11 in FIG. 2, traveling with the inertial force is started and vehicle speed SPD decreases gradually.

At this time, the charging/discharging power from power storage device 110 becomes zero, and thus, a decrease in the SOC is suppressed.

Then, when vehicle speed SPD decreases to a lower limit value LL within the permitted range predetermined with respect to target vehicle speed V1 (time t2 in FIG. 2), driving of motor generator 130 is restarted. The motor output at this time is set at PM1 larger than output PM0 required to maintain vehicle speed V1. As a result, vehicle 100 is accelerated. During generation of the driving power, an amount of decrease in the SOC is larger, as compared with the case where the inertial traveling is not executed. However, the power is not consumed due to the inertial traveling from times t1 to t2, and thus, the total SOC is maintained high (a solid line W17 in FIG. 2).

Then, when vehicle speed SPD increases to an upper limit value UL within the above predetermined permitted range, motor generator 130 is again stopped (time t3 in FIG. 2) and the inertial traveling is executed.

Thereafter, similarly, when vehicle speed SPD decreases to lower limit value LL, motor generator 130 is driven, and further, when vehicle speed SPD increases to upper limit value UL, motor generator 130 is stopped.

By repeating the driving power change operation as described above, a decrease in the SOC of the power storage device can be suppressed while the average speed is maintained almost at V1, although vehicle speed SPD fluctuates within the aforementioned permitted range. Consequently, the overall energy efficiency can be improved and the distance that can be traveled using the power stored in the power storage device is extended.

At time t8, the inclination of the road surface changes and vehicle 100 comes to the downhill. Then, in accordance with the change in the inclination, the driving power of motor generator 130 at the time of the acceleration traveling is reduced to PM2 (<PM1). Since the driving power corresponding to the gravity acting on the vehicle can be reduced by decreasing the driving power of motor generator 130 as described above, an increase in the vehicle speed can be consequently suppressed.

It should be noted that the motor output and the acceleration time of the motor generator during the acceleration traveling can be set arbitrarily. For example, the acceleration time may be set at a prescribed time period and the motor output may be set such that vehicle speed SPD can be increased from lower limit value LL to upper limit value UL within that time period. Alternatively, the motor output used for acceleration may be set at a prescribed output and the acceleration time may be left to the nature. If the acceleration time is too short, large power is required, and thus, a torque shock may occur. Conversely, if the motor output is too small, the acceleration time, i.e., a time period in which the motor generator is driven, becomes longer and execution of the inertial traveling becomes difficult. Therefore, the acceleration time and the motor output at the time of acceleration are appropriately set in consideration of the drivability and the energy efficiency.

In addition, the motor output when vehicle 100 travels on the downhill may be set, for example, such that the influence of the gravity is canceled out and the acceleration equal to the acceleration when vehicle 100 travels on the flat road can be obtained, or such that a sum of a duration of the acceleration traveling and a duration of the inertial traveling is equal between on the flat road and on the downhill. Furthermore, the motor output is desirably set to change in accordance with the magnitude of the inclination. When the inclination of the downhill further increases, the motor output may be further decreased accordingly.

The case where the inclination changes in a step-like manner has been described by way of example in FIG. 2. However, when the inclination increases continuously, the motor output may also be continuously increased accordingly.

As described above, in the inertial traveling control in the first embodiment, when the user request power is almost constant, the driving power change operation as shown in FIG. 2 is executed. On the other hand, at the time of acceleration and at the time of deceleration in which the user request power fluctuates, the driving power change operation is not executed. At the time of acceleration in which the user request power increases, the driving power is continuously outputted from motor generator 130 and the vehicle is accelerated. At the time of deceleration in which the user request power decreases, the driving power from motor generator 130 is stopped or decreased and the vehicle is decelerated to a desired vehicle speed.

Figure 3:
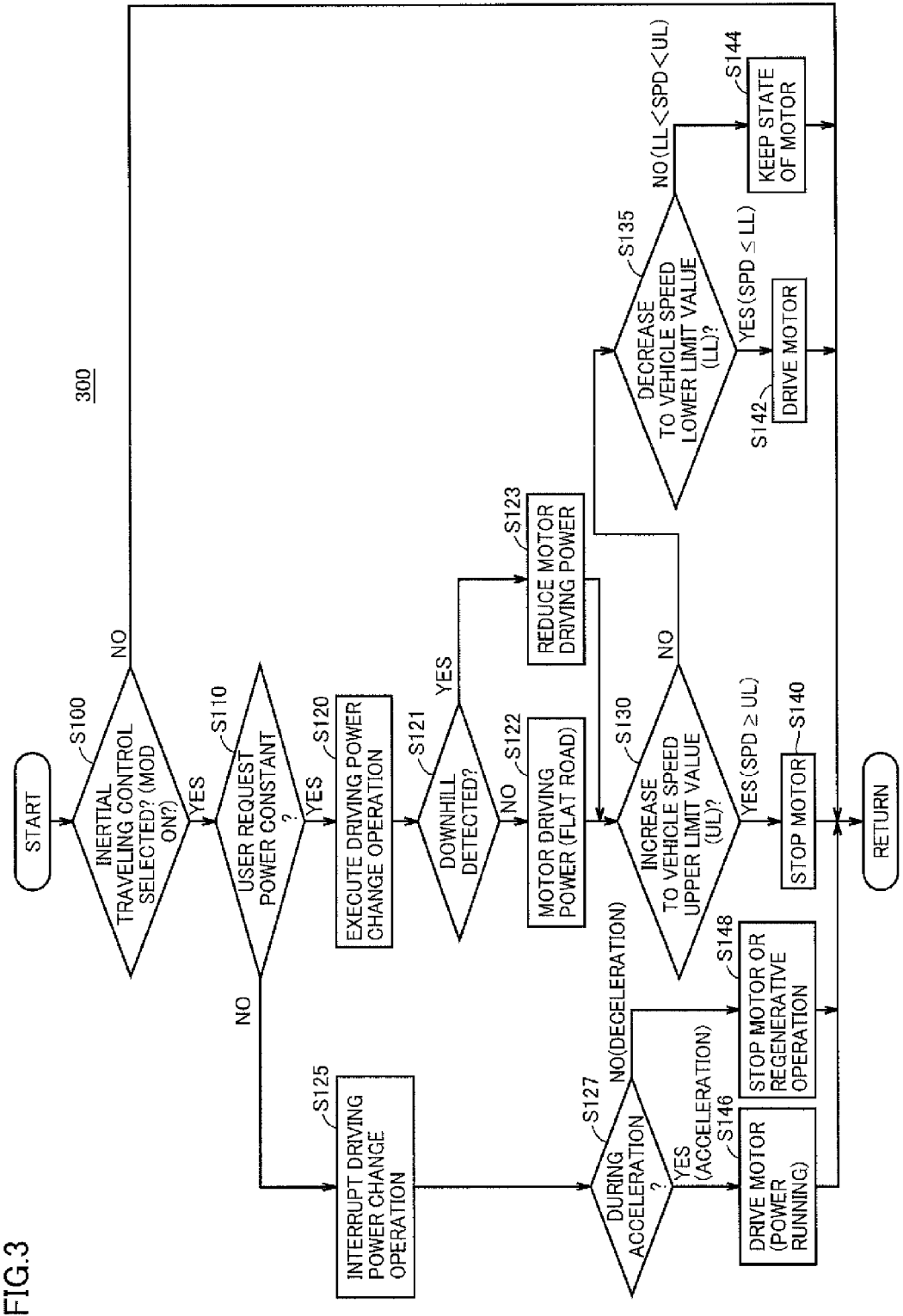
FIG. 3 is a flowchart for describing an inertial traveling control process executed by an ECU in the first embodiment.

FIG. 3 is a flowchart for describing an inertial traveling control process executed by ECU 300 in the first embodiment. Each step in the flowcharts shown in FIG. 3 and FIGS. 5, 7, 9, 11, and 14 described below is implemented by executing, at a prescribed cycle, a program prestored in ECU 300. Alternatively, as to a part of the steps, the processes can also be implemented by constructed dedicated hardware (electronic circuit).

Referring to FIGS. 1 and 3, in step (hereinafter "step" is abbreviated as "S") 100, ECU 300 determines whether or not the inertial traveling control has been selected, based on mode signal MOD set by the user.

If mode signal MOD is off and the inertial traveling control is not selected (NO in S100), the subsequent process is skipped and ECU 300 returns the process to the main routine.

If mode signal MOD is on and the inertial traveling control has been selected (YES in S100), the process proceeds to S110. ECU 300 next determines whether or not the user request power is almost constant, based on requested torque TR.

If the user request power is almost constant (YES in S110), the process proceeds to S120 and ECU 300 selects execution of the driving power change operation. It should be noted that, although not shown in FIG. 3, motor generator 130 is first stopped and the inertial traveling is executed as shown in FIG. 2 immediately after the start of the driving power change operation.

Next, in S121, ECU 300 determines whether or not a downhill has been detected, based on signal SLP from inclination detecting unit 200.

If a downhill is not detected (NO in S121), the process proceeds to S122. As the motor driving power at the time of the acceleration traveling, ECU 300 sets the driving power when vehicle 100 travels on a flat road. Thereafter, the process proceeds to S130.

On the other hand, if a downhill has been detected (YES in S121), the process proceeds to S123. As the motor driving power at the time of the acceleration traveling, ECU 300 sets the driving power reduced in accordance with the inclination as compared with that on the flat road. Then, the process proceeds to S130.

Then, in S130, ECU 300 determines whether or not vehicle speed SPD has increased to upper limit value UL within the speed permitted range.

As described above, motor generator 130 is first stopped and the inertial traveling is executed immediately after the start of the driving power change operation. Therefore, vehicle speed SPD is lower than upper limit value UL and vehicle speed SPD decreases gradually.

In other words, since vehicle speed SPD has not yet increased to upper limit value UL within the speed permitted range (NO in S130), the process proceeds to S135. ECU 300 next determines whether or not vehicle speed SPD has decreased to lower limit value LL within the speed permitted range.

If vehicle speed SPD is decreasing within the speed permitted range (LL<SPD<UL), i.e., if vehicle speed SPD has not yet decreased to lower limit value LL within the speed permitted range (NO in S135), the process proceeds to S144. ECU 300 keeps the current state of motor generator 130 and continues the inertial traveling. Thereafter, the process is returned to the main routine and the process is executed again from S100 in the next control cycle.

If vehicle speed SPD has decreased to lower limit value LL within the speed permitted range (SPD≤LL) while the inertial traveling continues (YES in S135), the process proceeds to S142. ECU 300 drives motor generator 130 and executes the acceleration traveling, using the driving power set in S122 or S123. As a result, vehicle speed SPD increases.

While this acceleration traveling is being executed and the vehicle speed is increasing within the speed permitted range, NO is selected in S130 and S135. In S144, ECU 300 continues the acceleration traveling until vehicle speed SPD reaches upper limit value UL within the speed permitted range.

If vehicle 100 returns from the downhill to the flat road while the acceleration traveling is being executed, the motor driving power is returned by S121 and S122 to the driving power on the flat road.

If vehicle speed SPD has increased to upper limit value UL within the speed permitted range (YES in S130), the process proceeds to S140. ECU 300 stops motor generator 130 and executes the inertial traveling.

While the user request power is kept almost constant, the driving power change operation as described above is executed such that vehicle speed SPD is maintained within the speed permitted range.

On the other hand, if the user request power fluctuates due to acceleration or deceleration (NO in S110), the process proceeds to S125. ECU 300 interrupts the driving power change operation.

If an instruction for acceleration is provided by the user request power (YES in S127), ECU 300 drives motor generator 130 in a power running state and accelerates vehicle 100 (S146).

On the other hand, if an instruction for deceleration is provided from the user (NO in S127), the process proceeds to S148. ECU 300 decelerates vehicle 100 by the inertial traveling in which motor generator 130 is stopped (S148). Alternatively, if it is required to decelerate more rapidly, ECU 300 decelerates vehicle 100 along with the regenerative braking in which motor generator 130 is driven in a regenerative state. Alternatively, ECU 300 may decelerate vehicle 100 while switching between deceleration by the inertial traveling and deceleration along with the regenerative braking.

Thereafter, if the acceleration or deceleration operation by the user ends and the user request power becomes almost constant (YES in S110), the driving power change operation is restarted.

By executing the control in accordance with the process described above, the driving power change operation in which the inertial traveling and the acceleration traveling are repeated can be executed in the state where the user request power is almost constant. When the inclination of the road surface changes and the vehicle travels on the downhill, the driving power of the motor generator is reduced in accordance with the increase in the inclination in the downward direction. As a result, an increase in the vehicle speed on the downhill caused by the gravity can be suppressed and the energy efficiency during traveling of the vehicle can be improved.

[Second Embodiment]

In the first embodiment, the following configuration has been described: when the road surface changes from the flat road to the downhill during the inertial traveling control, control is executed such that the driving power of the motor generator at the time of the acceleration traveling is reduced, thereby maintaining the vehicle speed on the flat road nearly equal to the vehicle speed on the downhill.

However, if more or less speed increase feeling is obtained when the vehicle travels on the downhill as compared with when the vehicle travels on the flat road, it may match the driver's feeling in some cases.

Thus, in a second embodiment, when the vehicle travels on the downhill during the inertial traveling control, control is executed such that the lower limit value within the vehicle speed permitted range is increased as compared with that on the flat road. With such control, when the vehicle travels on the downhill, the vehicle speed can be maintained within the permitted range and the average vehicle speed can be increased as compared with that on the flat road. As a result, matching with the driver's feeling can be achieved.

Figure 4:
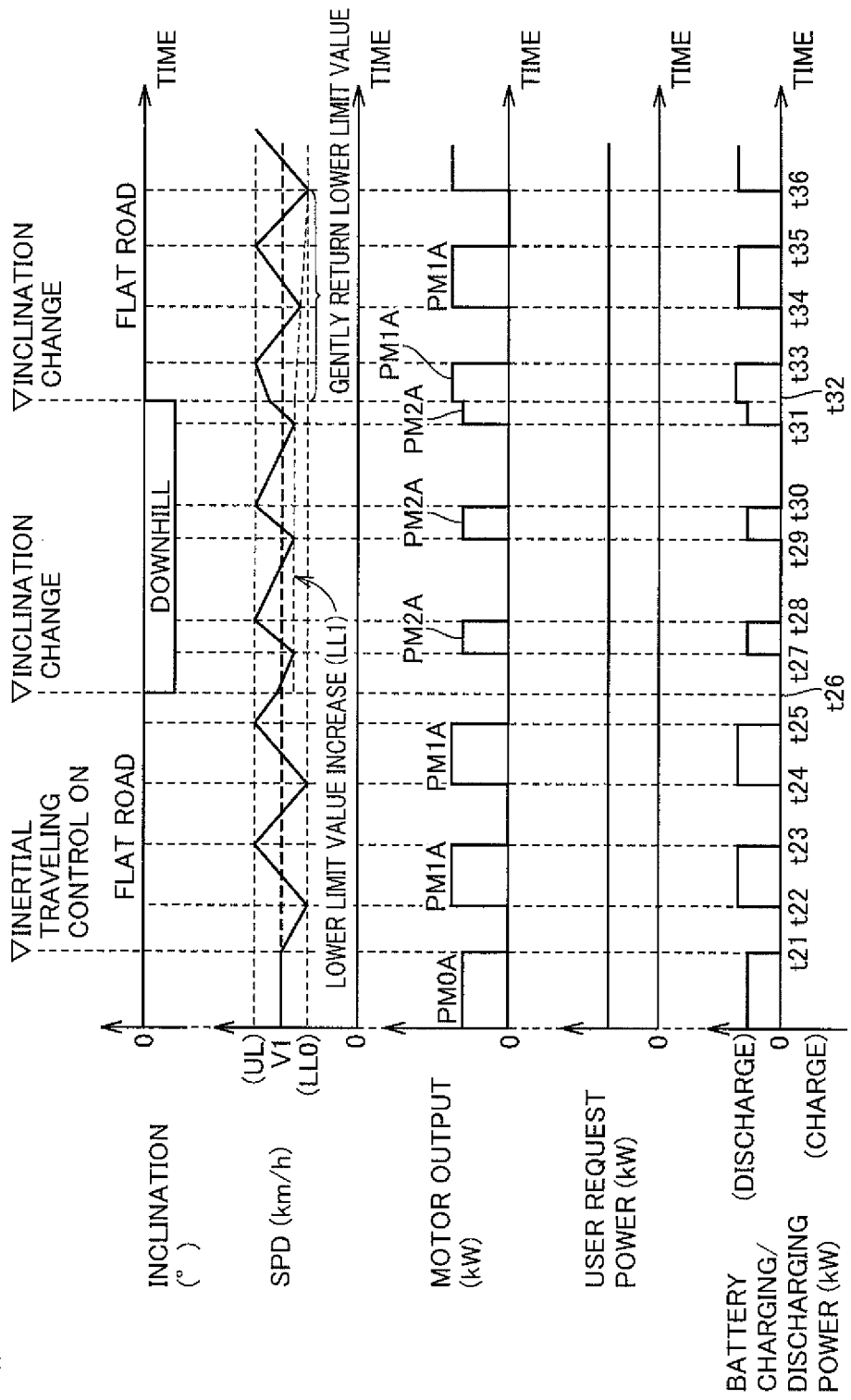
FIG. 4 is a time chart for describing an overview of inertial traveling control in a second embodiment.

FIG. 4 is a diagram for describing an overview of inertial traveling control in the second embodiment. In FIG. 4, the horizontal axis indicates time and the vertical axis indicates an inclination of a road surface, vehicle speed SPD, an output of the motor generator, user request power, and charging/discharging power for the power storage device.

Referring to FIG. 4, similarly to the description about the first embodiment, when a downhill is recognized during execution of the inertial traveling control (time t26 in FIG. 4), the motor driving power at the time of the acceleration traveling is reduced from PM1A to PM2A (times t26 to t32 in FIG. 4).

In addition, in the second embodiment, during the time period (times t26 to t32) in which the vehicle is traveling on the downhill, lower limit value LL within the vehicle speed permitted range is increased from LL0 on the flat road to LL1 (>LL0). During times t26 to t32, the inertial traveling control is executed such that vehicle speed SPD falls within a range from upper limit value UL to lower limit value LL1. As a result, the average vehicle speed is slightly increased within the permitted range.

Then, when the vehicle returns from the downhill to the flat road (t32 in FIG. 4), the motor driving power is increased to PM1A for the flat road.

On the other hand, when the average vehicle speed on the downhill is set to be higher than that on the flat road, the speed decrease feeling provided to the driver may be probably intensified when the vehicle returns from the downhill to the flat road. Therefore, in the second embodiment, when the vehicle returns from the downhill to the flat road and lower limit value LL within the vehicle speed permitted range is returned from LL1 to LL0, it is more preferable to gently change lower limit value LL from LL1 to LL0 over time like times t32 to t36 in FIG. 4. With this, when the vehicle returns from the downhill to the flat road, a step-like decrease in the average vehicle speed is suppressed and the excessive speed decrease feeling provided to the driver is prevented.

Figure 5:
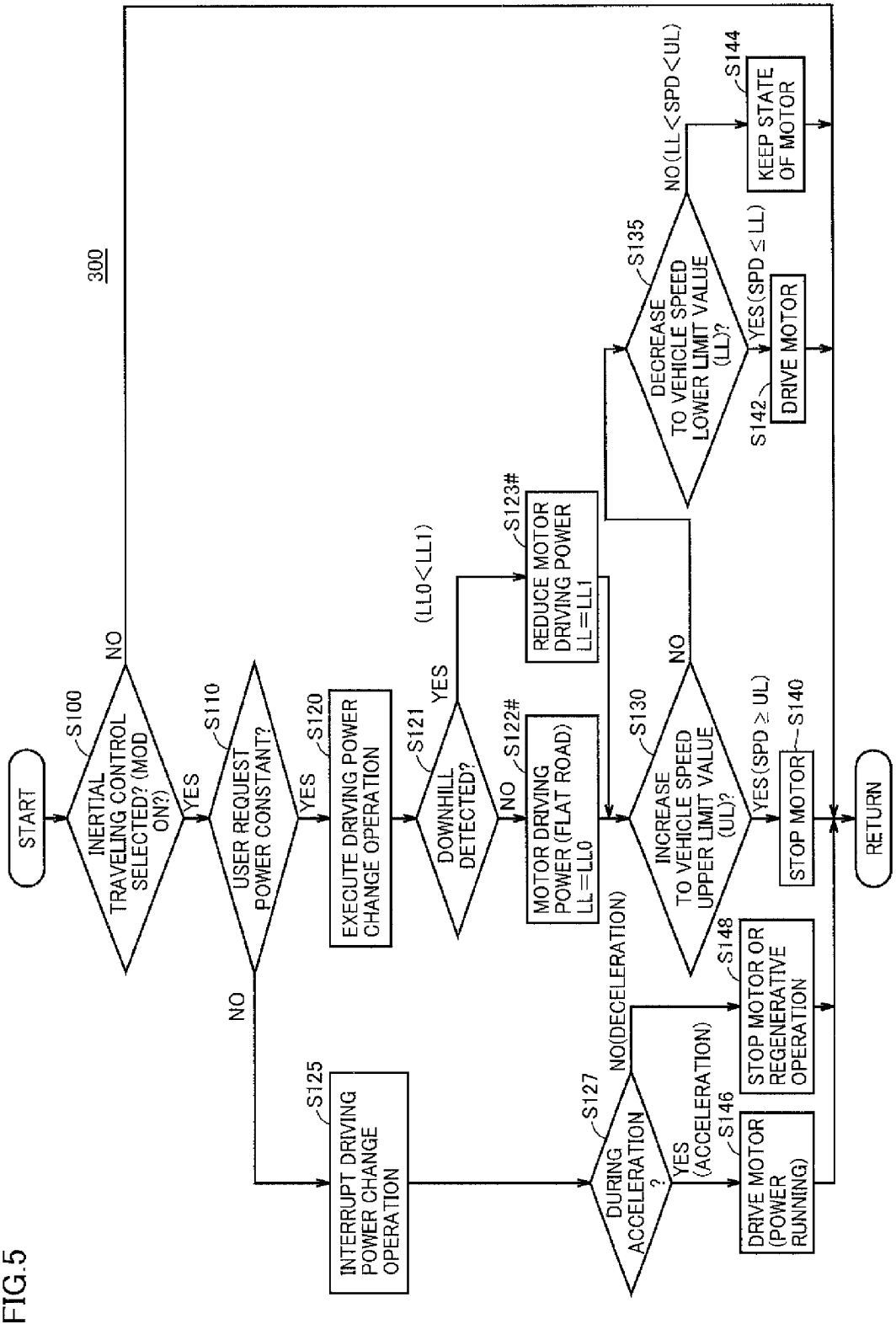
FIG. 5 is a flowchart for describing an inertial traveling control process executed by the ECU in the second embodiment.

FIG. 5 is a flowchart for describing an inertial traveling control process executed by ECU 300 in the second embodiment. FIG. 5 differs from the flowchart in the first embodiment shown in FIG. 3 in that steps S122 and S123 are replaced by steps S122# and S123#, respectively. The description of the steps common to FIG. 5 and FIG. 3 will not be repeated.

Referring to FIGS. 1 and 5, if the user request power is constant (YES in S110) and if the driving power change operation is executed (S120), ECU 300 determines in S121 whether or not a downhill has been detected, based on signal SLP from inclination detecting unit 200.

If a downhill has been detected (YES in S121), the process proceeds to S123#. As the motor driving power at the time of the acceleration traveling, ECU 300 sets the driving power reduced in accordance with the inclination as compared with that on the flat road. ECU 300 also sets the lower limit value within the vehicle speed permitted range to LL1 (>LL0) higher than that on the flat road. Then, the process proceeds to S130.

On the other hand, if a downhill is not detected (NO in S121), the process proceeds to S122#. As the motor driving power at the time of the acceleration traveling, ECU 300 sets the driving power when the vehicle travels on the flat road. ECU 300 also sets lower limit value LL within the vehicle speed permitted range to LL0. Then, the process proceeds to S130. It should be noted that, although not shown in FIG. 5, ECU 300 gently returns lower limit value LL from LL1 to LL0 over time as described with reference to FIG. 4 when lower limit value LL is returned from LL1 to LL0.

If the vehicle speed has decreased to lower limit value LL set in S122# or S123# (NO in S130 and YES in S135), ECU 300 executes the acceleration traveling using the driving power set in S122# or S123# (S142).

If the vehicle speed has increased to upper limit value UL during the acceleration traveling (YES in S130), ECU 300 stops motor generator 130 and executes the inertial traveling (S140).

If the vehicle speed is between lower limit value LL and upper limit value UL (NO in S135), ECU 300 keeps the current state of the motor in S144 and the acceleration traveling or the inertial traveling is continued.

By executing the control in accordance with the process described above, the energy efficiency can be improved by the inertial traveling control executed in consideration of the downhill, and matching with the driver's feeling on the downhill can be achieved. Furthermore, the excessive speed decrease feeling provided to the driver when the vehicle returns from the downhill to the flat road can be suppressed and the drivability can be enhanced.

[Third Embodiment]

As described above, when the road surface changes from the flat road to the downhill, the deceleration decreases due to the gravity acting on the vehicle. When the motor driving power at the time of the acceleration traveling on the downhill is decreased as compared with that on the flat road during the inertial traveling control as in the first embodiment, the decrease in the deceleration at the time of the acceleration traveling due to the gravity can be complemented by appropriately adjusting the motor driving power. However, at the time of the inertial traveling in which the motor generator is stopped, the decreased deceleration cannot be complemented. Therefore, the time period in which the inertial traveling is being executed becomes longer, which can cause a sense of discomfort to the driver.

Thus, in a third embodiment, when the vehicle travels on the downhill during the inertial traveling control, control is executed such that the motor generator is operated in a regenerative manner at the time of the inertial traveling and this braking force complements the deceleration decreased due to the gravity acting on the vehicle.

Figure 6:
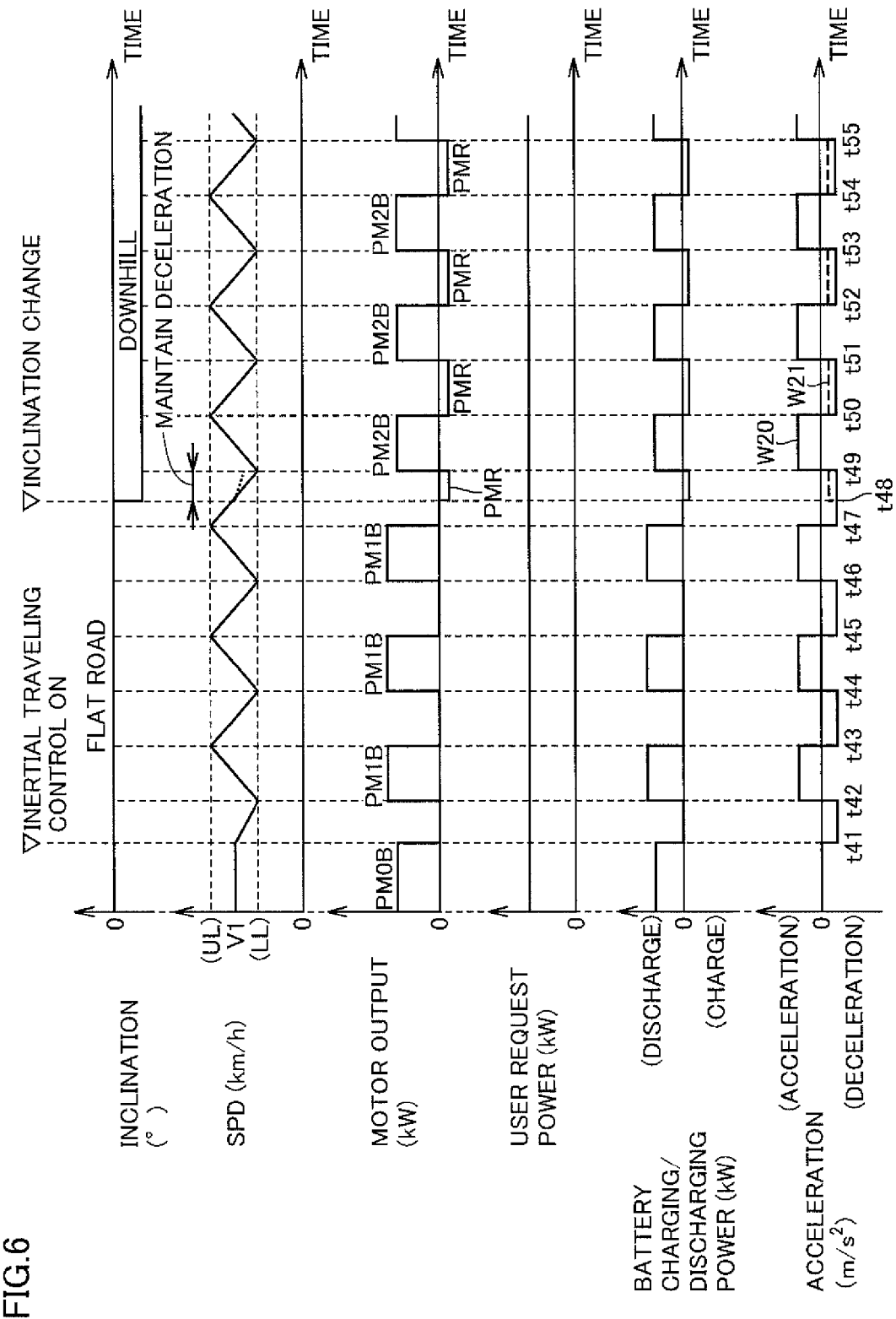
FIG. 6 is a time chart for describing an overview of inertial traveling control in a third embodiment.

FIG. 6 is a time chart for describing an overview of inertial traveling control in the third embodiment. In FIG. 6, the horizontal axis indicates time and the vertical axis indicates an inclination of a road surface, vehicle speed SPD, an output of the motor generator, user request power, charging/discharging power for the power storage device, and acceleration/deceleration. It should be noted that, as to the acceleration/deceleration, the acceleration is expressed in a positive value and the deceleration is expressed in a negative value.

Referring to FIG. 6, at time t41, the user provides an instruction for the inertial traveling control on the flat road. When a downhill is detected in the state where the acceleration traveling in which the motor generator is driven and the inertial traveling in which the motor generator is stopped are repeated (time t48), the driving power at the time of the acceleration traveling is reduced from PM1B to PM2B (<PM1B).

Furthermore, in the third embodiment, during the inertial traveling period at the time of traveling on the downhill, the motor generator is operated in a regenerative manner with PMR. Motor driving power PMR at this time is determined based on the driving power that can complement the influence of the gravity caused by the downhill. Ideally, it is desirable that motor driving power PMR should be equal to the acceleration force produced by the gravity. Motor driving power PMR may, however, be slightly different from the acceleration force produced by the gravity, as long as motor driving power PMR falls within a range where a sense of discomfort does not arise at the time of switching between the acceleration traveling and the inertial traveling.

With this, as shown in the bottom of FIG. 6, the following can be prevented: an absolute value of the deceleration during the inertial traveling at the time of traveling on the downhill becomes smaller than that at the time of traveling on the flat road (a broken line W21 in FIG. 6). In addition, the deceleration on the flat road can be made nearly equal to that on the downhill (a solid line W20 in FIG. 6). Furthermore, by setting motor driving power PM2B such that the acceleration at the time of the acceleration traveling on the downhill becomes nearly equivalent to that on the flat road, smoother feeling can be provided to the driver throughout the flat road and the downhill and the drivability can be enhanced.

Figure 7:
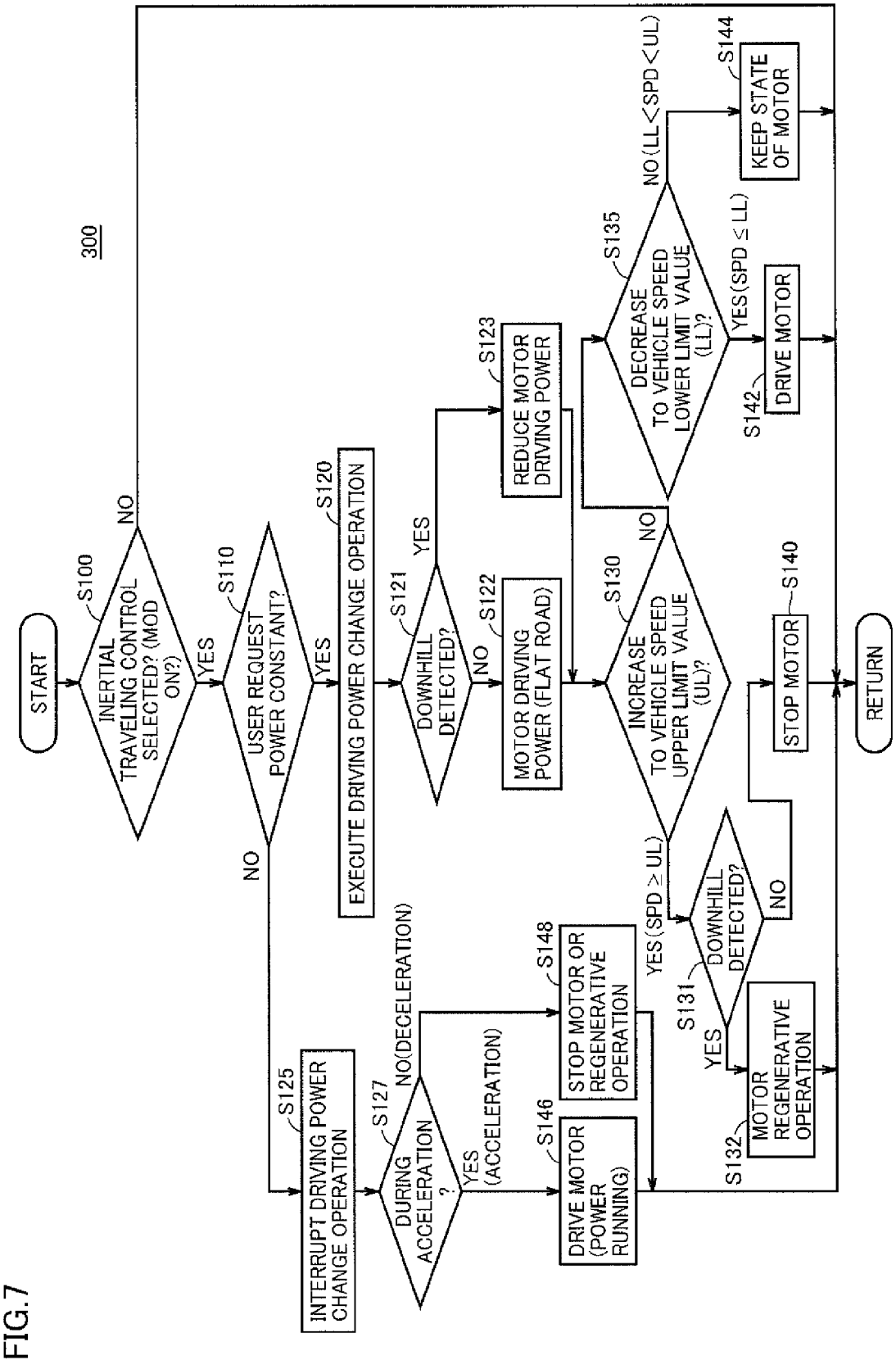
FIG. 7 is a flowchart for describing an inertial traveling control process executed by the ECU in the third embodiment.

FIG. 7 is a flowchart for describing an inertial traveling control process executed by ECU 300 in the third embodiment. FIG. 7 differs from the flowchart in the first embodiment shown in FIG. 3 in that steps S131 and S132 are further added. The description of the steps common to FIG. 7 and FIG. 3 will not be repeated.

Referring to FIGS. 1 and 7, if the user request power is constant (YES in S110) and if the driving power change operation is executed (S120), ECU 300 sets the driving power at the time of the acceleration traveling in accordance with the inclination (S121 to S123).

If the vehicle speed has decreased to lower limit value LL within the permitted range (YES in S135), the acceleration traveling is executed using the driving power set in accordance with the inclination.

Thereafter, if the vehicle speed has increased to upper limit value UL within the permitted range while the acceleration traveling is continued (YES in S130), the process proceeds to S131. ECU 300 determines whether or not the vehicle is currently traveling on the downhill.

If the vehicle is not traveling on the downhill (NO in S131), ECU 300 stops motor generator 130 and executes the inertial operation (S140).

On the other hand, if the vehicle is traveling on the downhill (YES in S131), the process proceeds to S132. ECU 300 operates motor generator 130 in a regenerative manner to generate the braking force that almost cancels out the influence of the gravity acting on the vehicle, and executes the inertial traveling.

By executing the control in accordance with the process described above, the energy efficiency can be improved by the inertial traveling control executed in consideration of the downhill, and the drivability can be enhanced by adjusting the deceleration at the time of the inertial traveling during traveling on the downhill.

It should be noted that the configuration according to the second embodiment can be further applied to the third embodiment as well.

[Fourth Embodiment]

In the third embodiment, the case where the deceleration decreases during the inertial traveling due to the gravity when the vehicle travels on the downhill has been described.

Figure 8:
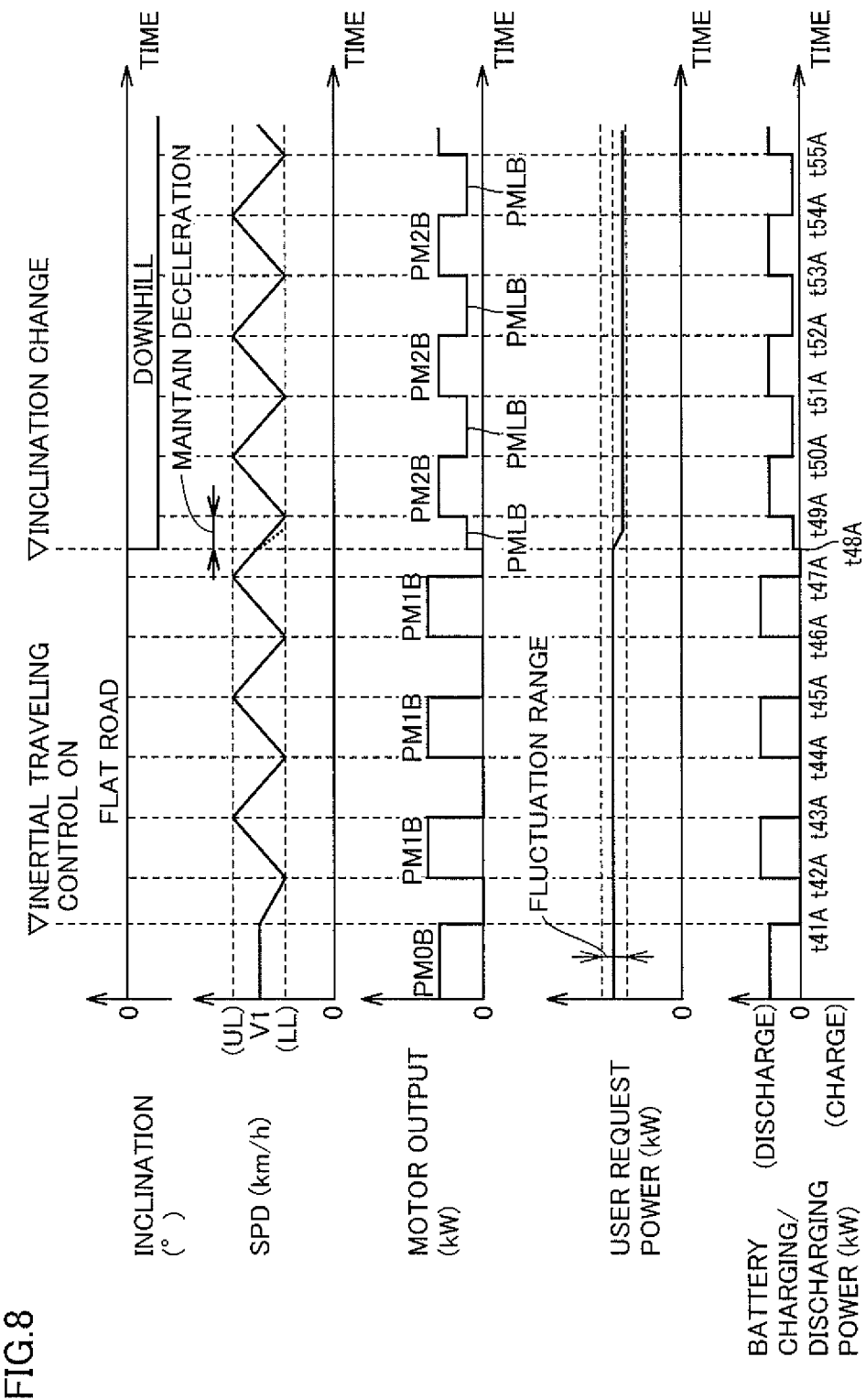
FIG. 8 is a time chart for describing an overview of inertial traveling control in a fourth embodiment.

On the other hand, in the case of a gentle downhill, when the vehicle comes to the downhill and when the user request power is decreased within a prescribed fluctuation range where the inertial traveling control can be continued as shown in FIG. 8, the deceleration caused by the decrease in the user request power may become larger in some cases than the acceleration increased due to the gravity. In such a case, even while the vehicle is traveling on the downhill, the deceleration at the time of the inertial traveling may increase as compared with when the vehicle travels on the flat road.

Thus, in a fourth embodiment, when the vehicle travels on the downhill during execution of the inertial traveling control and when the deceleration increases as compared with that during traveling on the flat road, the motor generator is operated with low driving power PMLB at the time of the inertial traveling, like times t48A to t49A, t50A to t51A, t52A to t53A, and t54A to t55A in FIG. 8. As a result, the deceleration during traveling on the downhill can be made nearly equal to that during traveling on the flat road, and thus, a torque shock and the like provided to the driver due to a change in the acceleration/deceleration can be prevented when the road surface changes from the flat road to the downhill.

It should be noted that the change in the deceleration can be obtained based on, for example, a signal detected by a not-shown acceleration sensor or calculation of temporal change in the vehicle speed.

Figure 9:
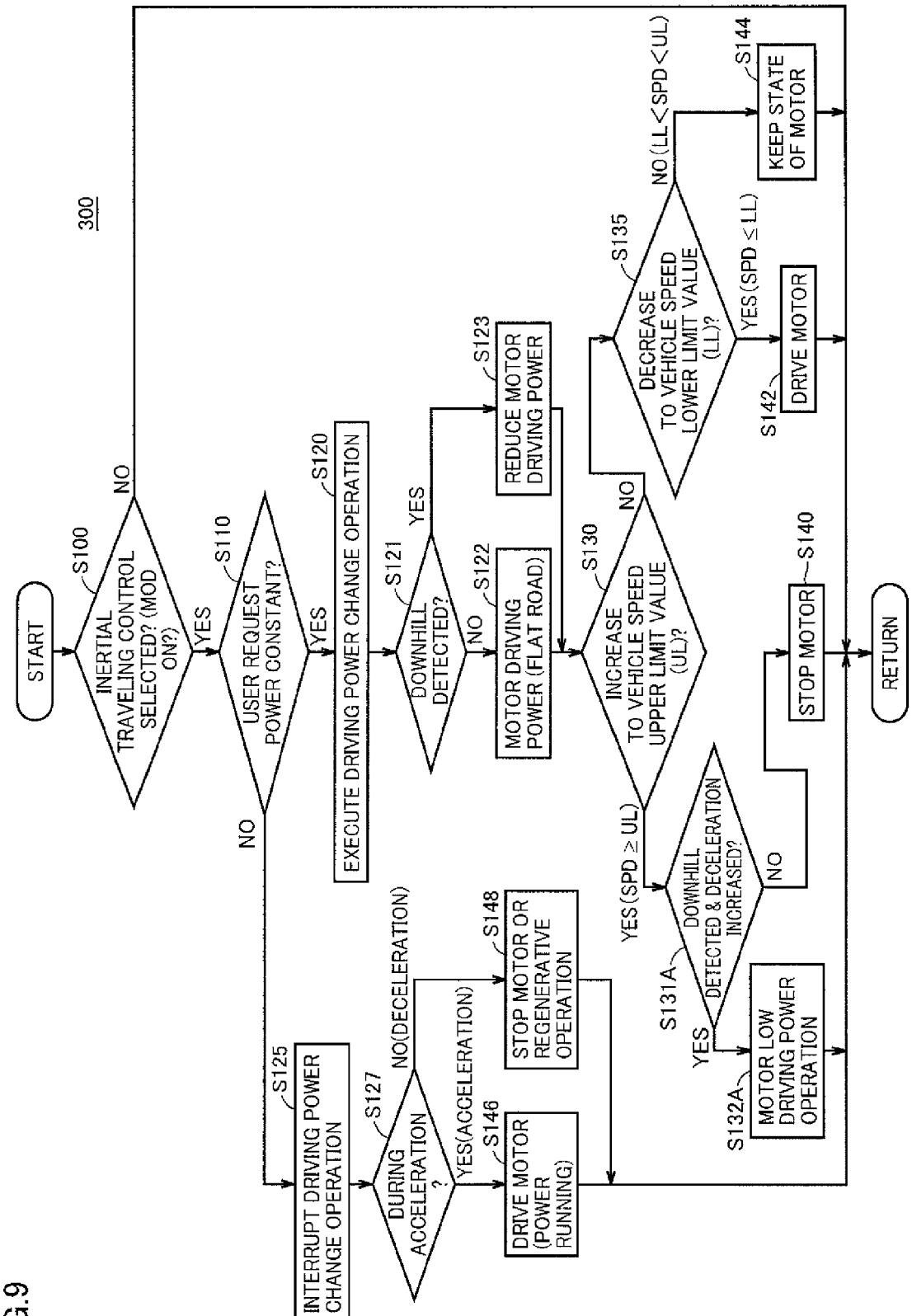
FIG. 9 is a flowchart for describing an inertial traveling control process executed by the ECU in the fourth embodiment.

FIG. 9 is a flowchart for describing an inertial traveling control process executed by ECU 300 in the fourth embodiment. FIG. 9 differs from the flowchart in the third embodiment shown in FIG. 7 in that steps S131 and S132 are replaced by steps S131A and S132A. The description of the steps common to FIG. 9 and FIGS. 3 and 7 will not be repeated.

Referring to FIGS. 1 and 9, if execution of the driving power change operation is selected (S120) and the vehicle speed has increased to upper limit value UL within the permitted range (YES in S130), the process proceeds to S131A. ECU 300 determines whether or not the vehicle is currently traveling on the downhill and an absolute value of the deceleration is larger than that during traveling on the flat road.

If the vehicle is not currently traveling on the downhill or if an absolute value of the deceleration is not larger than that during traveling on the flat road (NO in S131A), the process proceeds to S140. ECU 300 stops motor generator 130 and executes the inertial traveling.

On the other hand, if the vehicle is currently traveling on the downhill and if an absolute value of the deceleration is larger than that during traveling on the flat road (YES in S131A), the process proceeds to S132A. ECU 300 operates motor generator 130 with the low driving power that almost cancels out the increased deceleration, and executes the inertial traveling.

By executing the control in accordance with the process described above, the deceleration on the flat road and the deceleration on the downhill can be maintained almost constant, even when the user request power decreases within the range where the inertial traveling control can be continued, due to slight operation of an accelerator by the user, while the vehicle is traveling on the downhill during execution of the inertial traveling control. As a result, smoother feeling can be provided to the user and the drivability can be enhanced.

Figure 10:
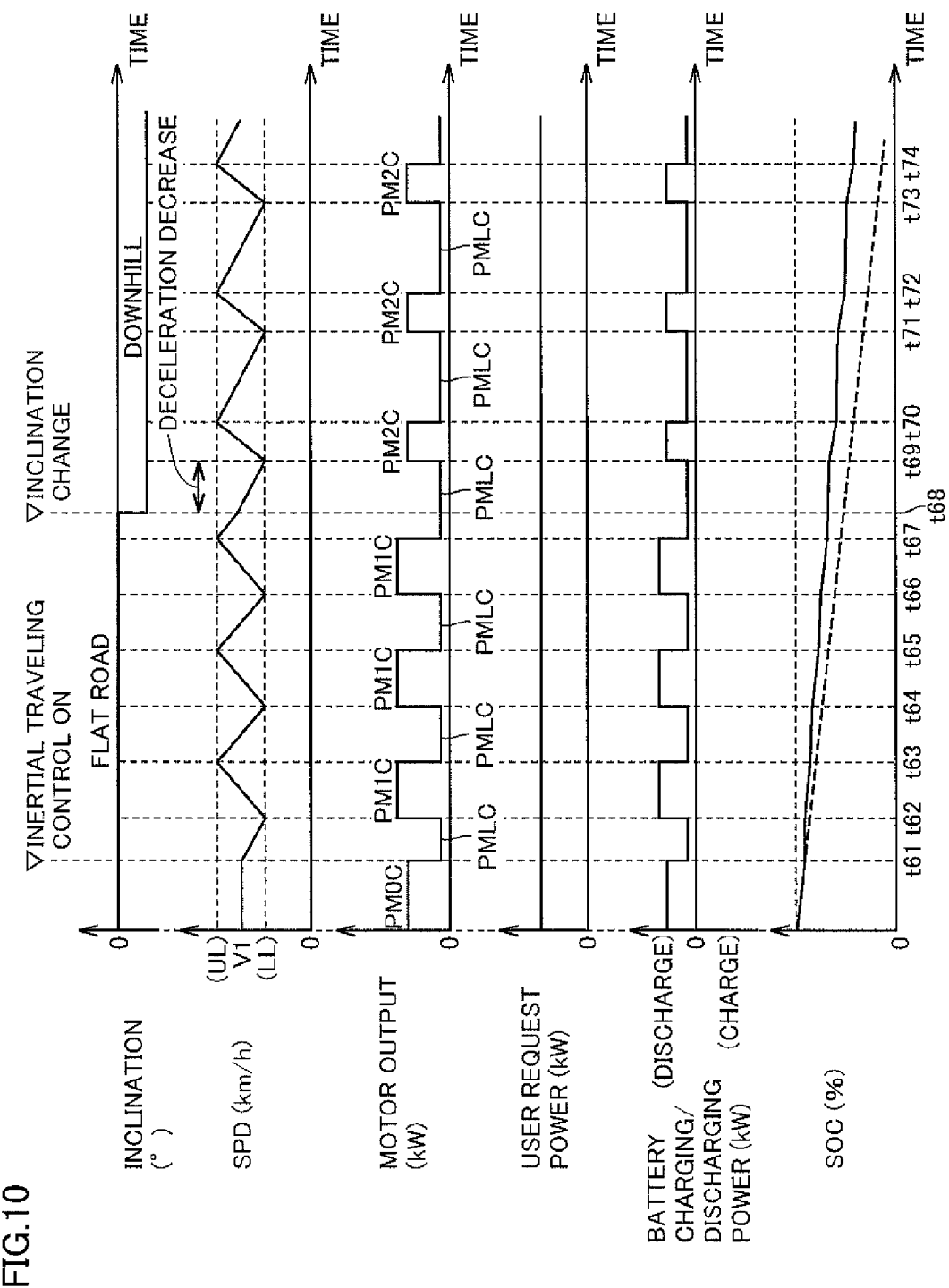
FIG. 10 is a time chart for describing another example of inertial traveling control.

In the aforementioned first to fourth embodiments, the motor generator is stopped at the time of the inertial traveling (at the time of the inertial traveling on the flat road in the third and fourth embodiments). In order to lessen the deceleration at the time of the inertial traveling and further enhance the drivability, for example, the motor generator may be operated with the low driving power at the time of the inertial traveling instead of stopping the motor generator, as shown in a time chart in FIG. 10. In this case, as shown in FIG. 10, both during traveling on the flat road and during traveling on the downhill, the motor generator may be operated with equal driving power PMLC. As in the third or fourth embodiment, however, the driving power that cancels out fluctuations in the deceleration may be used during traveling on the downhill.

[Fifth Embodiment]

Although the electric vehicle having the motor generator as a driving source has been described by way of example in the first to fourth embodiments, the aforementioned driving power change control is also applicable to a vehicle having an engine as a driving source.

Figure 11:
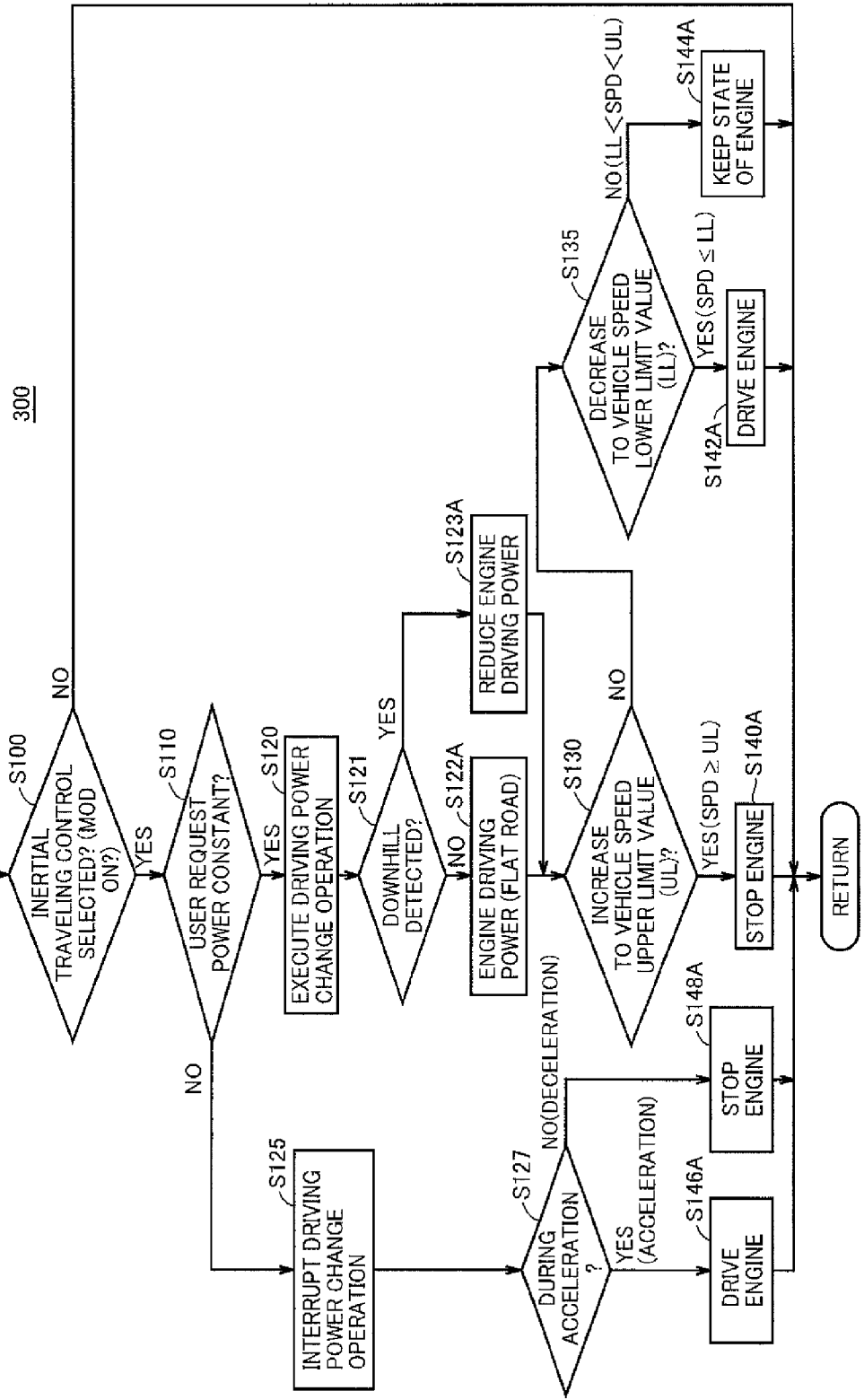
FIG. 11 is a flowchart for describing an inertial traveling control process executed by the ECU in a fifth embodiment in which an engine is used as a driving source.

FIG. 11 is a flowchart for describing an inertial traveling control process executed by ECU 300 in a fifth embodiment in which an engine is provided as a driving source. FIG. 11 differs from the flowchart in the first embodiment shown in FIG. 3 in that steps S122, S123, S140, S142, S144, S146, and S148 are replaced by S122A, S123A, S140A, S142A, S144A, S146A, and S148A, respectively. The process in each replaced step differs only in that instead of the motor generator, the engine outputs the driving power, and the remaining contents of the process are the same as those in FIG. 3. Therefore, the detailed description of the contents of the process will not be repeated. Schematically, if the inertial traveling control has been selected and if the user request power is constant, the engine is driven and the acceleration traveling is executed when the vehicle speed has decreased to the lower limit value. When the vehicle speed has increased to the upper limit value, the engine is stopped and the inertial traveling is executed. If a downhill has been detected, an engine output at the time of the acceleration traveling is set to be smaller than that on the flat road.

As described above, by applying the inertial traveling control to the vehicle having the engine as the driving source and decreasing the engine output on the downhill, the fuel efficiency can be improved and an increase in the vehicle speed on the downhill can be prevented.

It should be noted that the configurations similar to those according to the second to fourth embodiments can be applied to the fifth embodiment as well in which the driving source is the engine.

In addition, as described with reference to FIG. 10, during the inertial traveling, the engine is not stopped and can be brought into, for example, a low output state like an idling state. When the driving source is the engine, cranking of the engine is required to start the engine. Therefore, if the engine is stopped every time the inertial traveling is executed, the energy efficiency may become worse due to the energy required to start the engine. Therefore, when the energy of continuation of the operation of the engine is lower than the energy used to start the engine, even during the inertial traveling, the control shown in FIG. 10 may be more advantageous.

[Sixth Embodiment]

In the first to fifth embodiments, the inertial traveling control when the motor generator or the engine is provided alone as the driving source has been described.

In a sixth embodiment, a case where the inertial traveling control is applied to a vehicle that travels using the driving power provided from a plurality of driving sources will be described.

Figure 12:
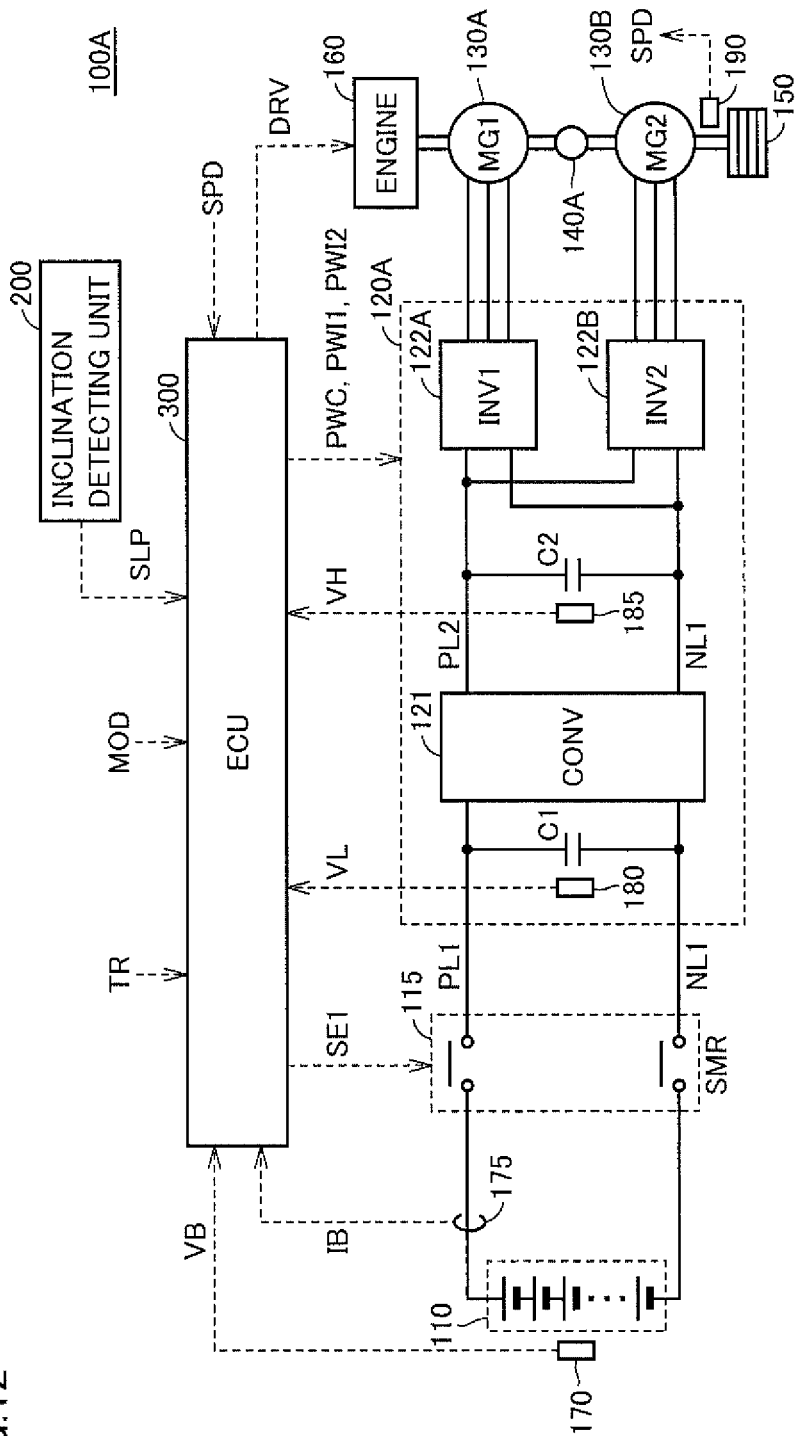
FIG. 12 is an overall block diagram of a hybrid vehicle according to a sixth embodiment.

FIG. 12 is an overall block diagram of a vehicle 100A according to the sixth embodiment. Vehicle 100A is a hybrid vehicle having, as driving sources, a motor generator and an engine serving as an internal combustion engine.

In FIG. 12, PCU 120 in FIG. 1 is replaced by a PCU 120A and motor generators 130A and 130B as well as an engine 160 are provided as the driving sources instead of motor generator 130. The description of the components common to FIG. 12 and FIG. 1 will not be repeated.

Referring to FIG. 12, PCU 120A includes converter 121, inverters 122A and 122B, capacitors C1 and C2, and voltage sensors 180 and 185.

Inverters 122A and 122B are connected in parallel to converter 121 by power lines PL2 and NL1.

Inverter 122A is controlled in accordance with control signal PWI1 from ECU 300, and converts DC power from converter 121 into AC power and drives motor generator 130A (hereinafter also referred to as "MG1"). Inverter 122A also converts AC power generated by motor generator 130A into DC power and charges power storage device 110 via converter 121.

Inverter 122B is controlled in accordance with control signal PWI2 from ECU 300, and converts DC power from converter 121 into AC power and drives motor generator 130B (hereinafter also referred to as "MG2"). Inverter 122B also converts AC power generated by motor generator 130B into DC power and charges power storage device 110 via converter 121.

An output shaft of each of motor generators 130A and 130B is coupled to a motive power transmission gear 140A configured to include a power split device such as, for example, a planetary gear. The driving power from motor generators 130A and 130B are transmitted to driving wheel 150.

Motor generators 130A and 130B are also coupled to engine 160 via motive power transmission gear 140A. Engine 160 is controlled in accordance with a control signal DRV from ECU 300. The driving power generated by engine 160 is transmitted to driving wheel 150 and motor generators 130A and 130B via motive power transmission gear 140A. ECU 300 cooperatively controls the driving power generated by motor generators 130A and 130B and engine 160, and causes the vehicle to travel.

In the sixth embodiment, motor generator 130A is used as a starter motor when starting engine 160, and is exclusively used as a generator driven by engine 160 to generate power. Motor generator 130B is exclusively used as a motor for driving driving wheel 150 with the power from power storage device 110.

Although the configuration including two motor generators and one engine is shown by way of example in FIG. 12, the number of the motor generators is not limited thereto. For example, one motor generator may be provided. Alternatively, two or more motor generators may be provided.

Figure 13:
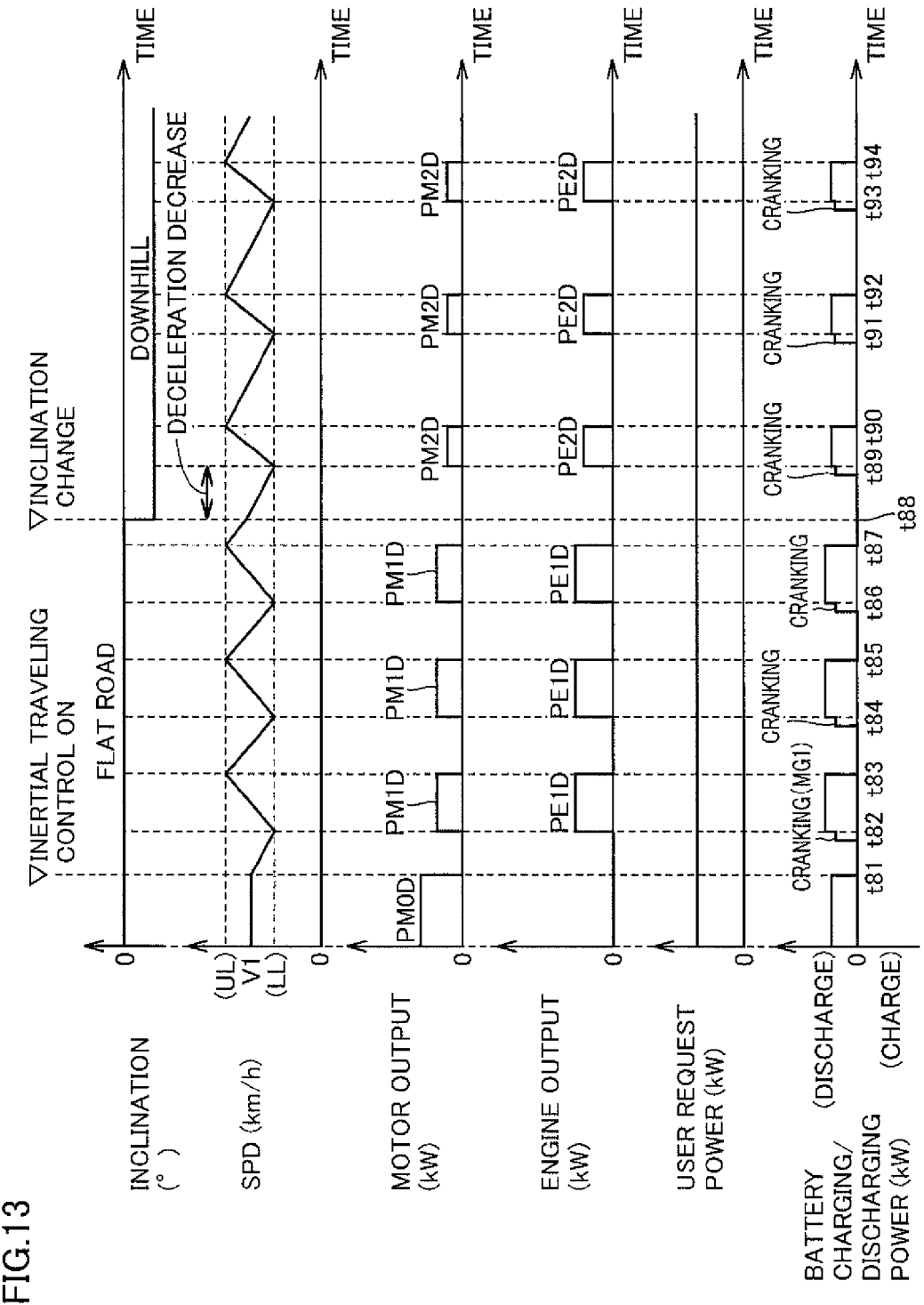
FIG. 13 is a time chart for describing an overview of inertial traveling control in the sixth embodiment.

Next, inertial traveling control in the sixth embodiment will be described with reference to FIGS. 13 and 14. FIG. 13 is a time chart for describing an overview of the inertial traveling control in the sixth embodiment. The horizontal axis indicates time and the vertical axis indicates an inclination of a road surface, vehicle speed SPD, an output of the motor generator (MG2), an output of the engine, user request power, and charging/discharging power for the power storage device.

Referring to FIG. 13, in the sixth embodiment, the driving power at the time of the acceleration traveling during the inertial traveling control is generated in accordance with the driving power from motor generator 130B and the driving power from engine 160. Specifically, in FIG. 13, during times t81 to t88 in which the vehicle is traveling on a flat road, a sum of driving power PM1D from motor generator 130B and driving power PE1D from engine 160 is set to be larger than driving power PM0D required to maintain the vehicle speed. After time t88 in which the vehicle is traveling on a downhill, a sum of driving power PM2D from motor generator 130B and driving power PE2D from engine 160 is set to be smaller than the total driving power during traveling on the flat road.

It should be noted that a ratio between the driving power from motor generator 130B and the driving power from engine 160 at the time of the acceleration traveling is appropriately set such that the total energy efficiency becomes high, taking the energy efficiency of motor generator 130B and engine 160 into consideration.

In addition, in FIG. 13, engine 160 is started every time the acceleration traveling is executed. Therefore, immediately before the acceleration traveling is executed, engine 160 is cranked with motor generator 130A (MG1).

Figure 14:
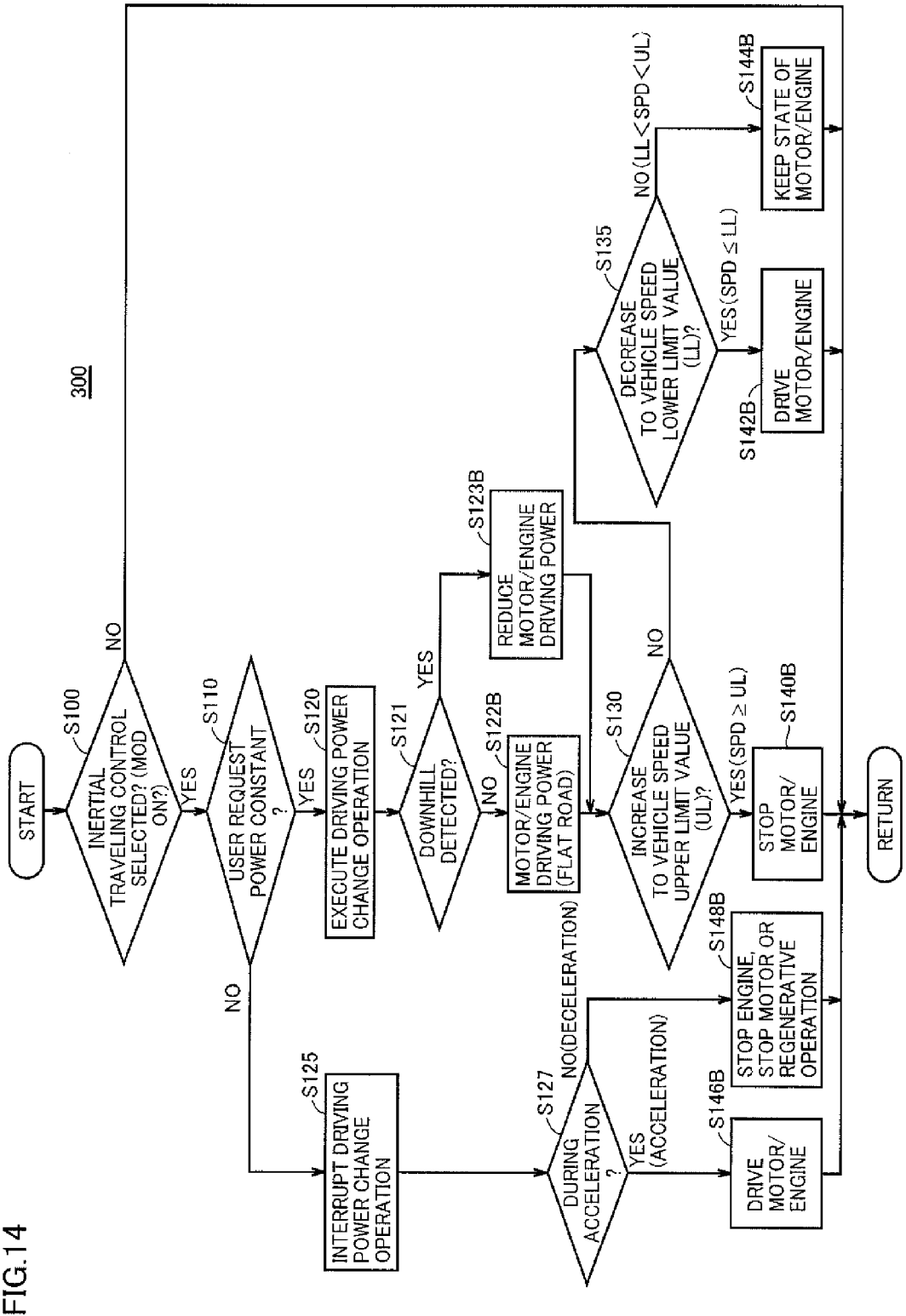
FIG. 14 is a flowchart for describing an inertial traveling control process executed by the ECU in the sixth embodiment.

FIG. 14 is a flowchart for describing an inertial traveling control process executed by ECU 300 in the sixth embodiment. FIG. 14 differs from the flowchart in the first embodiment shown in FIG. 3 in that steps S122, S123, S140, S142, S144, S146, and S148 are replaced by S122B, S123B, S140B, S142B, S144B, S146B, and S148B, respectively. The description of the steps common to FIG. 14 and FIG. 3 will not be repeated.

Referring to FIGS. 12 and 14, S122B, S123B, S140B, S142B, S144B, S146B, and S148B in FIG. 14 differ from S122, S123, S140, S142, S144, S146, and S148 in FIG. 3 in that driving conditions for engine 160 in addition to motor generator 130B (MG2) are added.

If the user request power is constant (YES in S110) and if the driving power change operation is executed (S120), ECU 300 sets the driving power of motor generator 130B and engine 160 at the time of the acceleration traveling in accordance with whether or not the road surface is a downhill. Specifically, if the road surface is not a downhill (NO in S121), ECU 300 selects the driving power when the vehicle travels on a flat road (S122B). If the road surface is a downhill (YES in S121), ECU 300 sets the driving power of motor generator 130B and engine 160 to be smaller than the driving power on the flat road, taking the influence of the gravity into consideration (S123B).

If vehicle speed SPD has decreased to lower limit value LL (YES in S135), ECU 300 drives MG2 and engine 160 using the driving power set in S122B or S123B, and executes the acceleration traveling (S142B).

If vehicle speed SPD has increased to upper limit value UL (YES in S130), ECU 300 stops MG2 and engine 160, and executes the inertial traveling (S140B).

If the user request power fluctuates (NO in S110) and if the driving power change operation is interrupted (S125) and if the vehicle is being accelerated (YES in S127), ECU 300 accelerates the vehicle using MG2 or using both MG2 and engine 160 (S146B). If the vehicle is being decelerated (NO in S127), ECU 300 stops engine 160, and stops or switches MG2 to the low output state and decelerates the vehicle (S148B). It should be noted that at the time of deceleration, the regenerative operation of MG2 may be executed to decelerate the vehicle.

By executing the control in accordance with the process described above, the energy efficiency can be improved by the inertial traveling control executed in consideration of the downhill in the hybrid vehicle having the engine and the motor generators as the driving sources.

In the above description, the case where the driving power of both MG2 and engine 160 is set to be smaller than that on the flat road when the vehicle travels on the downhill has been described by way of example. However, taking the energy efficiency, the responsiveness of the driving power and the like of MG2 and engine 160 into consideration, the driving power of any one of MG2 and engine 160 may be set to be smaller. In a particular case or at a particular timing, any one of MG2 and engine 160 may output the total driving power.

In addition, as described with reference to FIG. 10, either MG2 or engine 160 or both of MG2 and engine 160 may be operated with the low driving power at the time of the inertial traveling.

Furthermore, the configuration according to any one of the second to fourth embodiments, or a combination of the configurations according to the second and third embodiments, or a combination of the configurations according to the second and fourth embodiments can be applied to the sixth embodiment as well.

[Seventh Embodiment]

In the aforementioned sixth embodiment, the hybrid vehicle including the engine and the motor generators as the plurality of driving sources has been described by way of example. The present invention is, however, also applicable to a vehicle having other configurations, such as a twin-motor-type electric vehicle that can travel using the driving power from two motor generators serving as a plurality of driving sources as shown in FIG. 15, for example.

Figure 15:
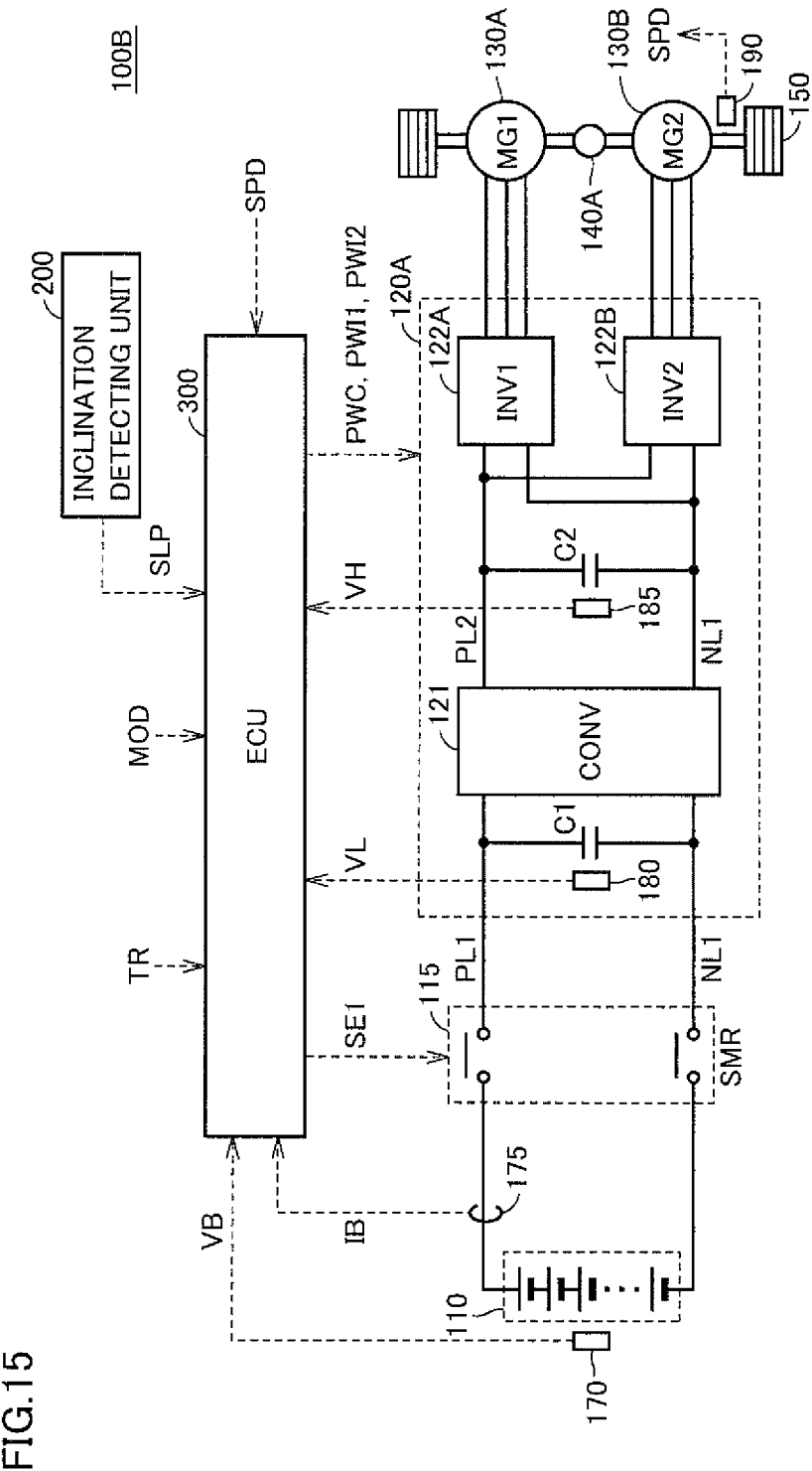
FIG. 15 is an overall block diagram of a vehicle according to a seventh embodiment in which two motor generators are used as driving sources.

A vehicle 100B in FIG. 15 differs from vehicle 100A in FIG. 12 in that engine 160 is not equipped. Vehicle 100B travels using the driving power from both motor generator 130A (MG1) and motor generator 130B (MG2).

In this case, power storage device 110 cannot be charged using motor generator 130A (MG1) unlike the sixth embodiment. However, by changing the configuration according to the sixth embodiment shown in FIG. 13 such that MG1 outputs the driving power of engine 160, the driving power change operation can be executed.

In addition, the present invention is also applicable to a case where MG1 is also used as a motor, not a generator, and the vehicle travels using the driving power generated by the three driving sources of MG1, MG2 and engine 160 in the configuration according to the sixth embodiment shown in FIG. 12.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

REFERENCE SIGNS LIST 100, 100A, 100B vehicle; 110 power storage device; 115 SMR; 120 PCU; 121 converter; 122, 122A, 122B inverter; 130, 130A, 130B motor generator; 140, 140A motive power transmission gear; 150 driving wheel; 160 engine; 170, 180, 185 voltage sensor; 175 current sensor; 190 speed sensor; 200 inclination detecting unit; 300 ECU; C1, C2 capacitor; PL1, PL2, NL1 power line

The invention claimed is:

1. A vehicle, comprising:
   a driving source generating driving power for traveling of the vehicle;
   a control device for controlling the driving source; and
   an inclination detecting unit for detecting an inclination of a road surface, wherein the control device executes a driving power change operation that:
   (A) when it has been detected that the road surface is a downhill, sets a lower limit value of a predetermined range of a speed of the vehicle to be higher than a lower limit value of a predetermined range of the speed of the vehicle when the detected road surface is a flat road; and
   (B) causes the vehicle to travel while switching the driving source between a first state and a second state such that the driving source is switched:
      (i) to the first state in response to the speed of the vehicle having decreased to the lower limit value within the permitted range that corresponds to the detected road surface, and
      (ii) to the second state in response to the speed of the vehicle having increased to an upper limit value within the permitted range that corresponds to the detected road surface, wherein a driving power of the driving source in the first state generates a first-level driving power, and a driving power of the driving source in the second state generates a driving power that is less than the first-level driving power.

2. The vehicle according to claim 1, wherein when a change in driving power requested from a user is within a prescribed range, the control device executes the driving power change operation.

3. The vehicle according to claim 1, wherein the control device switches between the first and second states such that a speed of the vehicle is maintained within the permitted range during execution of the driving power change operation.

4. The vehicle according to claim 1, wherein when the vehicle returns from the downhill to the flat road, the control device gently decreases the lower limit value over time.

5. The vehicle according to claim 1, wherein the control device sets the driving power in the second state when the vehicle is traveling on the downhill to be higher than the driving power in the second state when the vehicle is traveling on the flat road.

6. The vehicle according to claim 1, wherein
   the driving source is a rotating electric machine, and
   when the vehicle is traveling on the downhill, the control device executes a regenerative operation of the rotating electric machine in the second state.

7. The vehicle according to claim 1, wherein the control device sets the driving power in the first state lower as a magnitude of the inclination in a downward direction becomes higher.

8. The vehicle according to claim 1, wherein
   the driving power in said first state is set to be higher than a constant reference driving power that can maintain the speed of the vehicle, and
   the driving power in the second state is set to be lower than the reference driving power.

9. The vehicle according to claim 8, wherein
   the control device stops generation of the driving power from the driving source in the second state.

10. The vehicle according to claim 8, wherein
    the vehicle travels mainly using inertial force of the vehicle in the second state.

11. The vehicle according to claim 1, further comprising:
    another driving source generating driving power for traveling of the vehicle, wherein
    the control device executes a driving power change operation that causes the vehicle to travel while switching the driving source between a third state of the another driving source where second-level driving power is generated and a fourth state of the another driving source where driving power less than that in the third state is generated.

12. The vehicle according to claim 11, wherein the control device brings the another driving source into the third state when the driving source is in the first state, and brings the another driving source into the fourth state when the driving source is in the second state.

13. The vehicle according to claim 11, wherein the control device sets the driving power of the another driving source in the third state when the vehicle is traveling on the downhill to be less than when the vehicle is traveling on the flat road.

14. The vehicle according to claim 11, wherein
    a sum of the driving power of the driving source in the first state and the driving power of the another driving source in the third state is set to be higher than a constant reference driving power that can maintain the speed of the vehicle, and
    a sum of the driving power of the driving source in the second state and the driving power of the another driving source in the fourth state is set to be less than the reference driving power.

15. The vehicle according to claim 11, wherein
    one of the driving source and the another driving source is a rotating electric machine, and
    the other of the driving source and the another driving source is an engine.

16. The vehicle according to claim 11, wherein both of the driving source and the another driving source are rotating electric machines.

17. The vehicle according to claim 1, wherein the driving source is either a rotating electric machine or an engine.

18. A control method for a vehicle having a driving source generating driving power for traveling thereof and an inclination detecting unit for detecting an inclination of a road surface, the control method comprising the process of:
    executing a driving power change operation that:
    (A) when it has been detected that the road surface is a downhill, sets a lower limit value of a predetermined range of a speed of the vehicle to be higher than a lower limit value of a predetermined range of the speed of the vehicle when the detected road surface is a flat road; and (B) causes the vehicle to travel while switching the driving source between first and second states such that the driving source is switched:

(i) to the first state in response to the speed of the vehicle having decreased to the lower limit value within the permitted range that corresponds to the detected road surface, and (ii) to the second state in response to the speed of the vehicle having increased to an upper limit value within the permitted range that corresponds to the detected road surface, wherein a driving power of the driving source in the first state generates a first-level driving power, and a driving power of the driving source in the second state generates a driving power that is less than the first-level driving power.

19. A vehicle, comprising:

a driving source generating driving power for traveling of the vehicle;

a control device for controlling the driving source; and an inclination detecting unit for detecting an inclination of a road surface, wherein the control device executes a driving power change operation that:

(A) when it has been detected that the road surface is a downhill, sets: (i) a driving power in a first state to be less than a driving power in the first state when the vehicle is traveling on a flat road, and (ii) a driving power in a second state to be higher than a driving power in the second state when the vehicle is traveling on a flat road, wherein a driving power of the driving source in the first state generates a first-level driving power, and a driving power of the driving source in the second state generates a driving power that is less than the first-level driving power; and (B) causes the vehicle to travel while switching the driving source between the first state and the second state such that the driving power is switched, when a speed of the vehicle either: (i) increases to an upper limit of a speed permitted range of the vehicle, or (ii) decreases to a lower limit of the speed permitted range of the vehicle.

* * * * *